(12) United States Patent
Koga et al.

(10) Patent No.: US 12,530,697 B2
(45) Date of Patent: *Jan. 20, 2026

(54) DENIAL OF SERVICE SYSTEMS AND METHODS

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,221

(22) Filed: May 9, 2024

(65) Prior Publication Data

US 2024/0288873 A1    Aug. 29, 2024

Related U.S. Application Data

(63) Continuation of application No. 17/232,574, filed on Apr. 16, 2021, now Pat. No. 12,007,793.

(Continued)

(51) Int. Cl.
*G06Q 30/016* (2023.01)
*B64C 39/02* (2023.01)
(Continued)

(52) U.S. Cl.
CPC ......... *G06Q 30/016* (2013.01); *B64C 39/024* (2013.01); *B64U 10/14* (2023.01);
(Continued)

(58) Field of Classification Search
None
See application file for complete search history.

(56) References Cited

U.S. PATENT DOCUMENTS

| 5,378,010 A | 1/1995 | Marino et al. |
| 5,919,027 A | 7/1999 | Christenson |

(Continued)

*Primary Examiner* — Faris S Almatrahi
*Assistant Examiner* — Selena M Jin
(74) *Attorney, Agent, or Firm* — Foley & Lardner LLP

(57) ABSTRACT

A non-transitory computer-readable media comprising computer-readable instructions stored thereon that, when executed by a processor, causes the processor to generate a route, control a drone to surveil an area along the route, generate, from a sensor on the drone, status data for one or more refuse containers, analyze the status data to determine a status of refuse within the area, provide a notification to a customer based on the status of refuse, repeat surveillance to determine if the status of refuse has changed, generate a revised route in response to determining that the status of refuse has changed, and update a customer bill in response to determining that the status of refuse has changed.

18 Claims, 12 Drawing Sheets

Related U.S. Application Data

(60) Provisional application No. 63/011,593, filed on Apr. 17, 2020.

(51) Int. Cl.

| | | |
|---|---|---|
| *B64U 10/14* | (2023.01) | |
| *B64U 101/30* | (2023.01) | |
| *B65F 3/02* | (2006.01) | |
| *B65F 3/04* | (2006.01) | |
| *G01C 21/00* | (2006.01) | |
| *G01C 21/34* | (2006.01) | |
| *G01S 19/42* | (2010.01) | |
| *G05D 1/00* | (2024.01) | |
| *G05D 1/249* | (2024.01) | |
| *G05D 1/46* | (2024.01) | |
| *G05D 1/646* | (2024.01) | |
| *G05D 1/683* | (2024.01) | |
| *G05D 1/692* | (2024.01) | |
| *G06Q 10/047* | (2023.01) | |
| *G06Q 10/0631* | (2023.01) | |
| *G06Q 10/30* | (2023.01) | |
| *G06Q 30/04* | (2012.01) | |
| *G06V 20/10* | (2022.01) | |

(52) U.S. Cl.
CPC .............. *B65F 3/04* (2013.01); *G01C 21/343* (2013.01); *G01C 21/3852* (2020.08); *G01C 21/3885* (2020.08); *G01S 19/42* (2013.01); *G05D 1/0212* (2013.01); *G05D 1/0246* (2013.01); *G05D 1/0287* (2013.01); *G05D 1/101* (2013.01); *G05D 1/12* (2013.01); *G05D 1/249* (2024.01); *G05D 1/46* (2024.01); *G05D 1/646* (2024.01); *G05D 1/683* (2024.01); *G05D 1/692* (2024.01); *G06Q 10/047* (2013.01); *G06Q 10/06312* (2013.01); *G06Q 10/30* (2013.01); *G06Q 30/04* (2013.01); *B64U 2101/30* (2023.01); *B64U 2201/104* (2023.01); *B65F 2003/0269* (2013.01); *B65F 2003/0279* (2013.01); *B65F 2210/128* (2013.01); *B65F 2210/165* (2013.01); *G06V 20/176* (2022.01)

(56) References Cited

U.S. PATENT DOCUMENTS

| | | |
|---|---|---|
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | Mcneilus et al. |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | Mcneilus et al. |
| 6,105,984 A | 8/2000 | Schmitz et al. |
| 6,120,235 A | 9/2000 | Humphries et al. |
| 6,123,500 A | 9/2000 | Mcneilus et al. |
| 6,210,094 B1 | 4/2001 | Mcneilus et al. |
| 6,213,706 B1 | 4/2001 | Christenson |
| 6,224,318 B1 | 5/2001 | Mcneilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,390,758 B1 | 5/2002 | Mcneilus et al. |
| 6,447,239 B2 | 9/2002 | Young et al. |
| 6,474,928 B1 | 11/2002 | Christenson |
| 6,516,914 B1 | 2/2003 | Andersen et al. |
| 6,565,305 B2 | 5/2003 | Schrafel |
| 6,757,597 B2 | 6/2004 | Yakes et al. |
| 6,885,920 B2 | 4/2005 | Yakes et al. |
| 7,070,382 B2 | 7/2006 | Pruteanu et al. |
| 7,164,977 B2 | 1/2007 | Yakes et al. |
| 7,277,782 B2 | 10/2007 | Yakes et al. |
| 7,284,943 B2 | 10/2007 | Pruteanu et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,448,460 B2 | 11/2008 | Morrow et al. |
| 7,520,354 B2 | 4/2009 | Morrow et al. |
| 7,556,468 B2 | 7/2009 | Grata |
| 7,559,735 B2 | 7/2009 | Pruteanu et al. |
| 7,689,332 B2 | 3/2010 | Yakes et al. |
| 7,711,460 B2 | 5/2010 | Yakes et al. |
| 7,848,857 B2 | 12/2010 | Nasr et al. |
| 7,878,750 B2 | 2/2011 | Zhou et al. |
| 7,931,103 B2 | 4/2011 | Morrow et al. |
| 8,000,850 B2 | 8/2011 | Nasr et al. |
| 8,139,109 B2 | 3/2012 | Schmiedel et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,561,735 B2 | 10/2013 | Morrow et al. |
| 8,807,613 B2 | 8/2014 | Howell et al. |
| 8,947,531 B2 | 2/2015 | Fischer et al. |
| 9,045,014 B1 | 6/2015 | Verhoff et al. |
| 9,174,686 B1 | 11/2015 | Messina et al. |
| 9,216,856 B2 | 12/2015 | Howell et al. |
| 9,387,985 B2 | 7/2016 | Gillmore et al. |
| 9,420,203 B2 | 8/2016 | Broggi et al. |
| 9,656,640 B1 | 5/2017 | Verhoff et al. |
| 9,707,869 B1 | 7/2017 | Messina et al. |
| 9,880,581 B2 | 1/2018 | Kuriakose et al. |
| 9,981,803 B2 | 5/2018 | Davis et al. |
| 10,196,205 B2 | 2/2019 | Betz et al. |
| D843,281 S | 3/2019 | Gander et al. |
| 10,414,067 B2 | 9/2019 | Datema et al. |
| 10,434,995 B2 | 10/2019 | Verhoff et al. |
| 10,457,533 B2 | 10/2019 | Puszkiewicz et al. |
| D871,283 S | 12/2019 | Gander et al. |
| 10,558,234 B2 | 2/2020 | Kuriakose et al. |
| D888,629 S | 6/2020 | Gander et al. |
| 10,781,090 B2 | 9/2020 | Puszkiewicz et al. |
| 10,800,605 B2 | 10/2020 | Rocholl et al. |
| 10,843,379 B2 | 11/2020 | Rocholl et al. |
| 10,858,184 B2 | 12/2020 | Betz et al. |
| 10,859,167 B2 | 12/2020 | Jax et al. |
| D907,544 S | 1/2021 | Wall et al. |
| 10,899,538 B2 | 1/2021 | Nelson et al. |
| D909,934 S | 2/2021 | Gander et al. |
| 10,987,829 B2 | 4/2021 | Datema et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 2008/0077541 A1* | 3/2008 | Scherer ................. G06Q 30/04 705/400 |
| 2018/0097288 A1* | 4/2018 | DiDomenico ......... G06V 20/13 |
| 2019/0185077 A1 | 6/2019 | Smith et al. |
| 2019/0311333 A1* | 10/2019 | Kekalainen ............. H04W 4/38 |
| 2019/0344475 A1 | 11/2019 | Datema et al. |
| 2019/0351883 A1 | 11/2019 | Verhoff et al. |
| 2020/0023524 A1* | 1/2020 | Mohamed ............. B62B 5/0089 |
| 2020/0109963 A1* | 4/2020 | Zass ..................... G05D 1/0094 |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |

(56) References Cited

U.S. PATENT DOCUMENTS

| | | |
|---|---|---|
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0348681 A1 | 11/2020 | Clifton et al. |
| 2020/0348764 A1 | 11/2020 | Clifton et al. |
| 2020/0369468 A1* | 11/2020 | Searle ............ H04N 7/183 |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |
| 2020/0398772 A1 | 12/2020 | Wildgrube et al. |
| 2020/0398857 A1 | 12/2020 | Clifton et al. |
| 2020/0399058 A1 | 12/2020 | Rocholl et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0086991 A1 | 3/2021 | Betz et al. |
| 2021/0139237 A1 | 5/2021 | Nelson et al. |

* cited by examiner

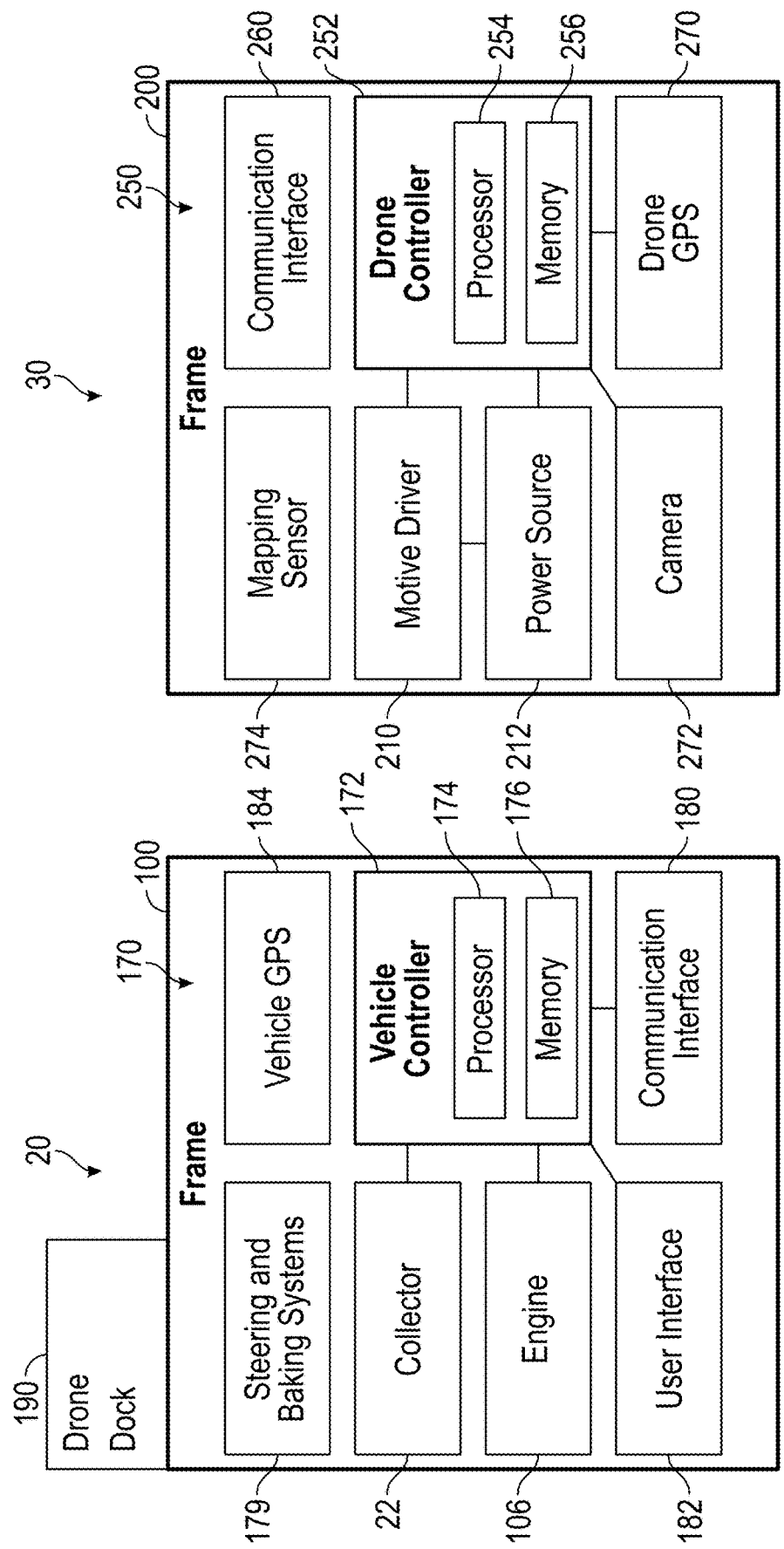

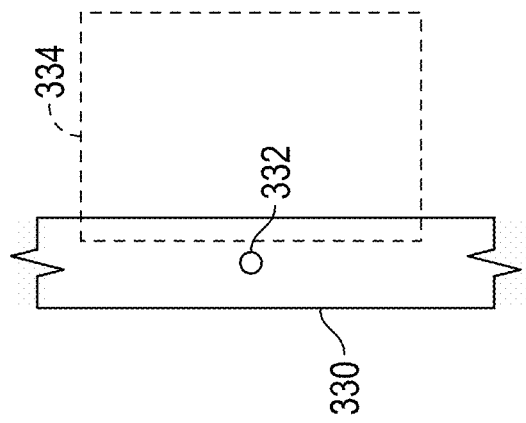
FIG. 7
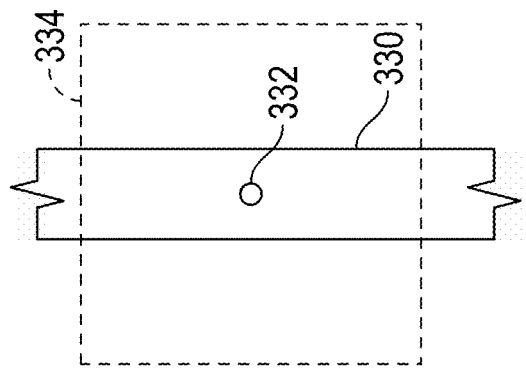
FIG. 8
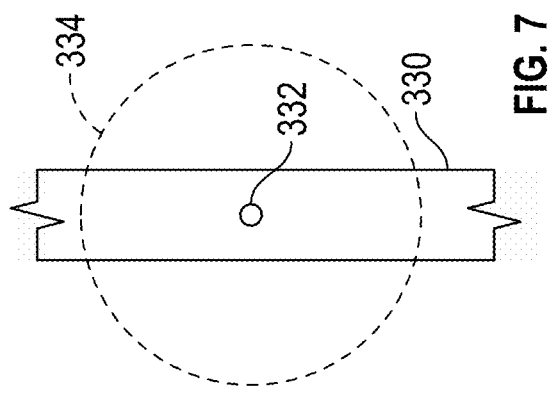
FIG. 9
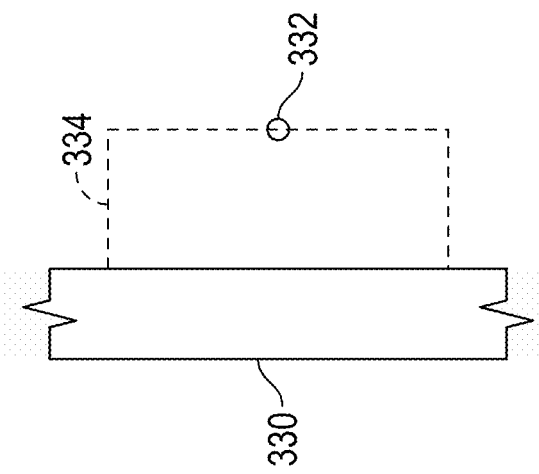
FIG. 10
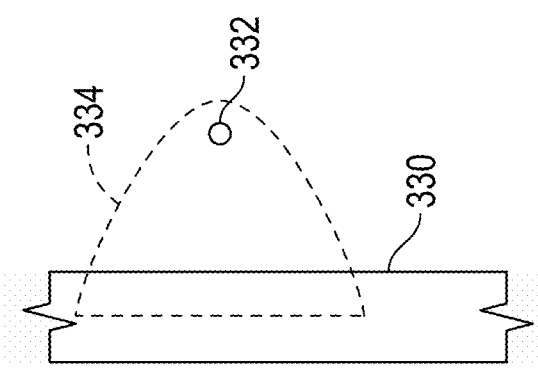
FIG. 11
FIG. 12

DENIAL OF SERVICE SYSTEMS AND METHODS

CROSS-REFERENCE TO RELATED PATENT APPLICATION

This application is a continuation of U.S. patent application Ser. No. 17/232,574, filed Apr. 16, 2021, which claims the benefit of and priority to U.S. Provisional Patent Application No. 63/011,593, filed Apr. 17, 2020, each of which is incorporated herein by reference in its entirety.

BACKGROUND

The present disclosure relates generally to refuse collection. More specifically, the present disclosure relates to systems for managing a refuse collection operation.

Refuse vehicles are used to collect refuse (e.g., garbage, recyclables, etc.) from customers and return that refuse to a collection site, such as a landfill or recycling center. The refuse is collected by a customer and placed into a refuse container, such as a can or dumpster. The type of refuse container used (e.g., size, shape, type of interface with the refuse vehicle, etc.) may vary depending upon the application (e.g., residential, commercial, industrial, etc.). The refuse vehicle then interacts with the refuse container to remove the refuse from the container and place it into a body of the vehicle.

SUMMARY

At least one embodiment relates to a refuse vehicle system that includes a refuse vehicle, a drone, and a controller. The drone includes a GPS and a sensor configured to provide data relating to a status of refuse within a scan area. The controller is configured to receive data from the sensor of the drone, determine the status of refuse within the scan area based on the data from the sensor of the drone, and at least one of generate a route for the refuse vehicle based on the status of refuse within the scan area, modify a route for the refuse vehicle based on the status of refuse within the scan area, and provide a signal to the refuse vehicle regarding the status of refuse within the scan area.

At least one embodiment relates to a non-transitory computer-relatable media. The non-transitory computer-readable media including computer related media instructions stored thereon that when executed by a processor causes the processor to generate a route plan; control one or more drones to surveil an area along the route, generating status data for one or more refuse containers; analyze status data to determine the status of the refuse container; provide a notification to a customer based on the determined status; repeat surveillance to determine if the status of the refuse container has changed; revise the route plan based on the determined status; and update the customer bill based on the determined status.

At least one embodiment relates to a method of providing a refuse removal service. The method includes generating, by a service manager, a route plan for a refuse vehicle, the route plan identifying a stop for a refuse vehicle to retrieve refuse from a refuse container associated with a customer. The method further includes providing a drone including a controller and a sensor configured to identify a status of the refuse container. The method further includes transmitting, by the controller, the status data of the refuse container to the service manager. The method further includes analyzing, by the service manager, the status obtained by the drone. The method further includes controlling the drone to travel to the stop and identify the status of the refuse container using the sensor. The status of the refuse container includes at least one of (a) a position of the refuse container relative to a path of the refuse vehicle, (b) an orientation of the refuse container, or (c) a position of the refuse container relative to an obstacle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 4 is a block diagram of the refuse vehicle of FIG. 1.

FIG. 5 is a block diagram of the drone of FIG. 1.

FIGS. 7-12 illustrate scan areas for a drone, according to various exemplary embodiments.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems and methods for selectively supplying a service to a customer are shown and described. In a typical application, a refuse vehicle travels along a route, collecting refuse at multiple locations and from multiple customers. The customer places the refuse container in a location and an orientation that facilitates the refuse vehicle accessing the refuse container (e.g., grabbing, lifting, and dumping the refuse container). By way of example, a refuse container may be placed near a curb such that a collector can reach out and interact with the refuse container without an operator leaving the vehicle. However, customers may sometimes fail to present their refuse containers in an accessible configuration. By way of example, the refuse container may be placed too far from a road for a collector to reach, in an orientation that prevents the collector from engaging the refuse container, or in a position where the refuse container is obstructed by an obstacle. By way of another example, the user may neglect to ready their refuse container for pickup entirely (e.g., leave the refuse container in their home). In such a situation, the refuse vehicle may be unable to retrieve the refuse from the refuse container, resulting in an incomplete stop along the route. Alternatively, the operator may exit the refuse vehicle and reposition the refuse vehicle to permit access by the collector. In each situation, time is unnecessarily wasted in the process of collecting refuse.

A system for selectively supplying service to a customer (e.g., a denial of service system) described herein utilizes one or more drones to survey a route taken by a refuse vehicle. Surveillance of an area along the route may take place in advance of the arrival of the refuse vehicle in that area. The drone may provide status data (e.g., images, point maps, etc.) from a scan area at each stop to a service manager (e.g., a cloud server), which utilizes the status data to determine a status of the refuse container at each stop. The status indicates if additional resources (e.g., intervention of an operator) will be required to empty the refuse container, or if the refuse container will be entirely unable to be emptied. Based on this status information, the service manager can provide various notifications to the customer, adjust the route of the refuse vehicle, adjust customer billing statements, or perform other functions.

OVERVIEW

Figure 1:
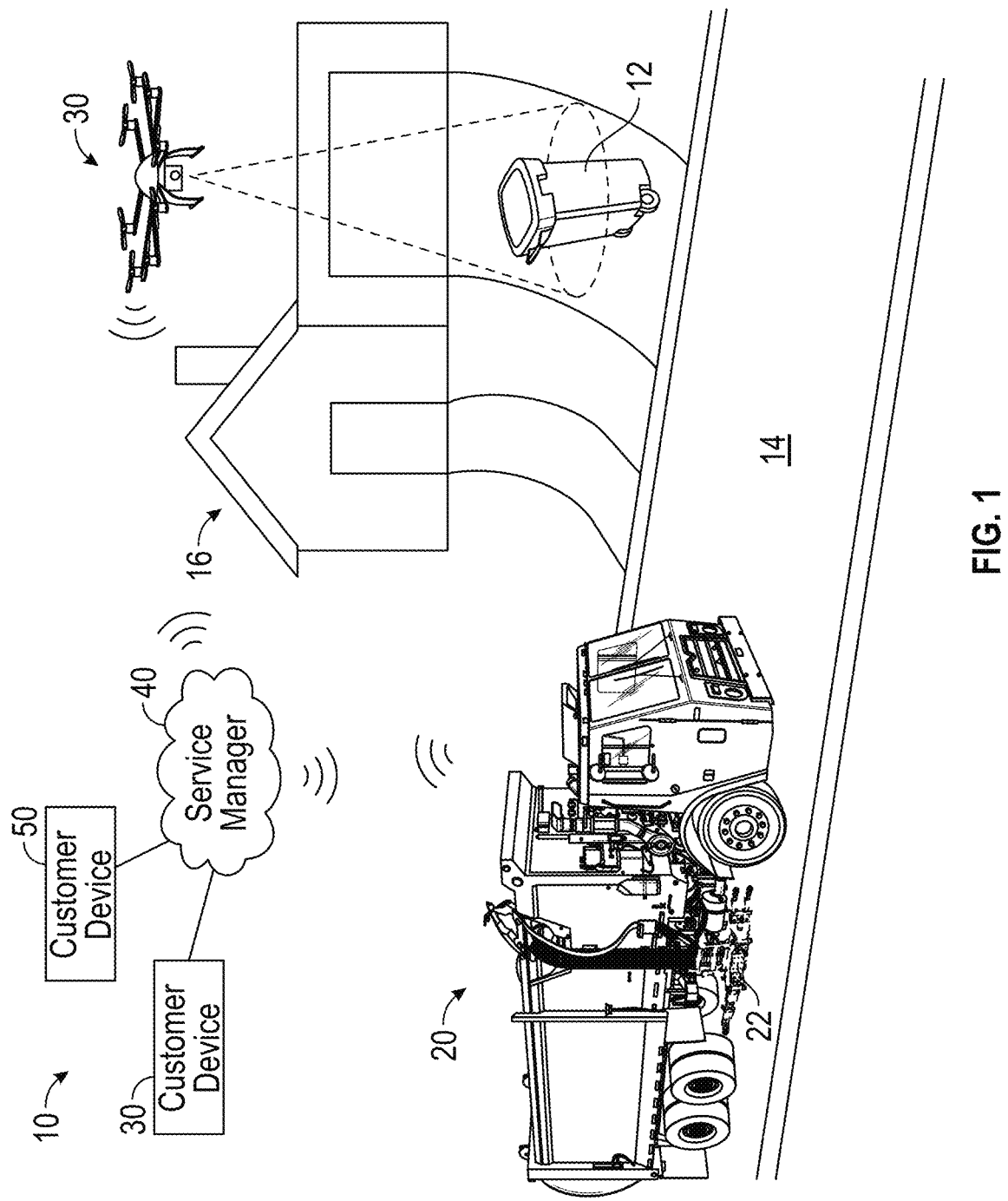
FIG. 1 is a perspective view of a system for selectively supply service to a customer including a refuse vehicle, a drone, and a service manager, according to an exemplary embodiment.

Referring to FIG. 1, a system for selectively supplying service to a customer (e.g., a denial of service system), is shown as system 10 according to an exemplary embodiment. More specifically, the system 10 is a system for selectively collecting and disposing of refuse from a refuse container 12 (e.g., a trash can, a dumpster, etc.) supplied by the customer (e.g., a client, a patron, etc.). The system 10 includes a refuse vehicle 20 that collects the refuse from the refuse container 12. In some embodiments, the refuse vehicle 20 includes a collector 22 that selectively couples to (e.g., engages with) the refuse container 12, lifts the refuse container 12, and dumps the refuse container 12 into a body of the refuse vehicle 20 to collect the refuse. In other embodiments, an operator exits the refuse vehicle to empty the refuse container into the refuse vehicle 20.

During normal operation, the refuse vehicle 20 travels along a route according to a route plan until reaching a stop where a refuse container 12 is located. As shown in FIG. 1, the route includes a road 14 (e.g., a path, a street, a highway, etc.), and the stop corresponds to a structure (e.g., a building, a home, an industrial building, a commercial building, a residential building, etc.), shown as building 16. The customer places the refuse container 12 adjacent the road 14 (e.g., near a curb, etc.) in advance of the arrival of the refuse vehicle 20. The refuse vehicle 20 drives along the road 14 until reaching the refuse container 12. The refuse vehicle 20 then performs a pickup to collect the refuse from the refuse container 12 and proceeds along the route to the next stop. For a standard pickup, this process can be performed without additional intervention by an operator. By way of example, if the refuse vehicle 20 includes the collector 22 (e.g., a side-loading arm), the refuse vehicle 20 may be able to empty the refuse container 12 without the operator exiting the refuse vehicle 20. By way of another example, if the refuse vehicle 20 is not equipped with a collector 22, an operator may be required to perform an action that requires a standard amount of time (e.g., walking to the curb to collect the refuse container 12, dumping the refuse container 12 into a hopper, and returning the refuse container to the curb) during a standard pickup.

In some situations, the stop requires a non-standard pickup such that additional operator intervention is required to empty the refuse container 12 (i.e., the pickup is an extended-length pickup) or the refuse container is unable to be emptied at all (i.e., the pickup is an incomplete pickup). By way of example, the refuse container 12 may be situated too far from the road 14 for the collector 22 to reach the refuse container 12. By way of another example, the refuse container 12 may be oriented in such a way that the collector 22 is unable to couple to the refuse container 12 (e.g., the refuse container 12 may be knocked over). By way of another example, the refuse container 12 may be obstructed (e.g., by a mailbox or a parked car) such that the collector 22 is unable to reach the refuse container 12. By way of yet another embodiment, the refuse container 12 may be entirely absent (e.g., the customer may have forgotten to place the refuse container 12 outside of the building 16). To reduce the time required to complete the route and to maximize utility to the customer, it is desirable to minimize the number of non-standard pickups (e.g., extended-length pickups and incomplete pickups).

To accomplish this, the system 10 utilizes one or more drones 30 to identify the status of the refuse container 12 prior to arrival of the refuse vehicle 20 at the stop. The drones 30 may operate autonomously utilizing one or more sensors. By way of example, a drone 30 may utilize location data associated with a predetermined schedule of the route to identify the locations of scan areas at the stops along the route. The drone 30 may navigate to each stop utilizing the location data and a global positioning system (GPS) to determine the location of the drone 30 relative to each stop. Once at the stop, the drone 30 may utilize one or more sensors to identify the status of one or more refuse containers 12 within the scan area of the stop. By way of example, status information (e.g., status data) gathered by the drone 30 may include a quantity of refuse containers 12 present at a stop (e.g., 0, 1, 2, etc.), the type of each refuse container 12 (e.g., the size, the type of interface (e.g., front loading, side loading, etc.), the type of material contained within the refuse container 12 (e.g., trash, recyclable material, etc.), etc.), a location of each refuse container 12 (e.g., relative to the road 14), an orientation of each refuse container 12, a pose of each refuse container 12 (i.e., the location and orientation of the refuse container 12), and/or other information.

The drone 30 may transfer this status information to a cloud device or refuse service manager, shown as service manager 40 (e.g., a cloud server, a cloud controller, etc.) configured to store and process data. Using the status information for a given stop, the service manager 40 is configured to evaluate whether or not a standard pickup can be performed. The service manager 40 may further determine if the stop will be an extended-length pickup (e.g., the refuse container 12 can be picked up, but will require additional operator intervention to do so), or an incomplete pickup (e.g., the refuse container 12 is not present, the refuse container 12 is not accessible even with operator intervention).

Based on the determination of the status and the type of pickup, the service manager may issue certain communications to the refuse vehicle 20 or to the customer. By way of example, the service manager may adjust the route plan for the refuse vehicle 20 based on this determination. By way of another example, the service manager may provide a notification to a customer that their refuse container 12 will require a non-standard pickup and request for the customer to move their refuse container 12 to bring it into condition for a standard pickup. Such a communication may be sent to a user device, shown as customer device 50 (e.g., a smartphone, a tablet, a laptop, etc.). By way of another example, the service manager may adjust billing for the customer based on the determination.

Refuse Vehicle

Figure 2:
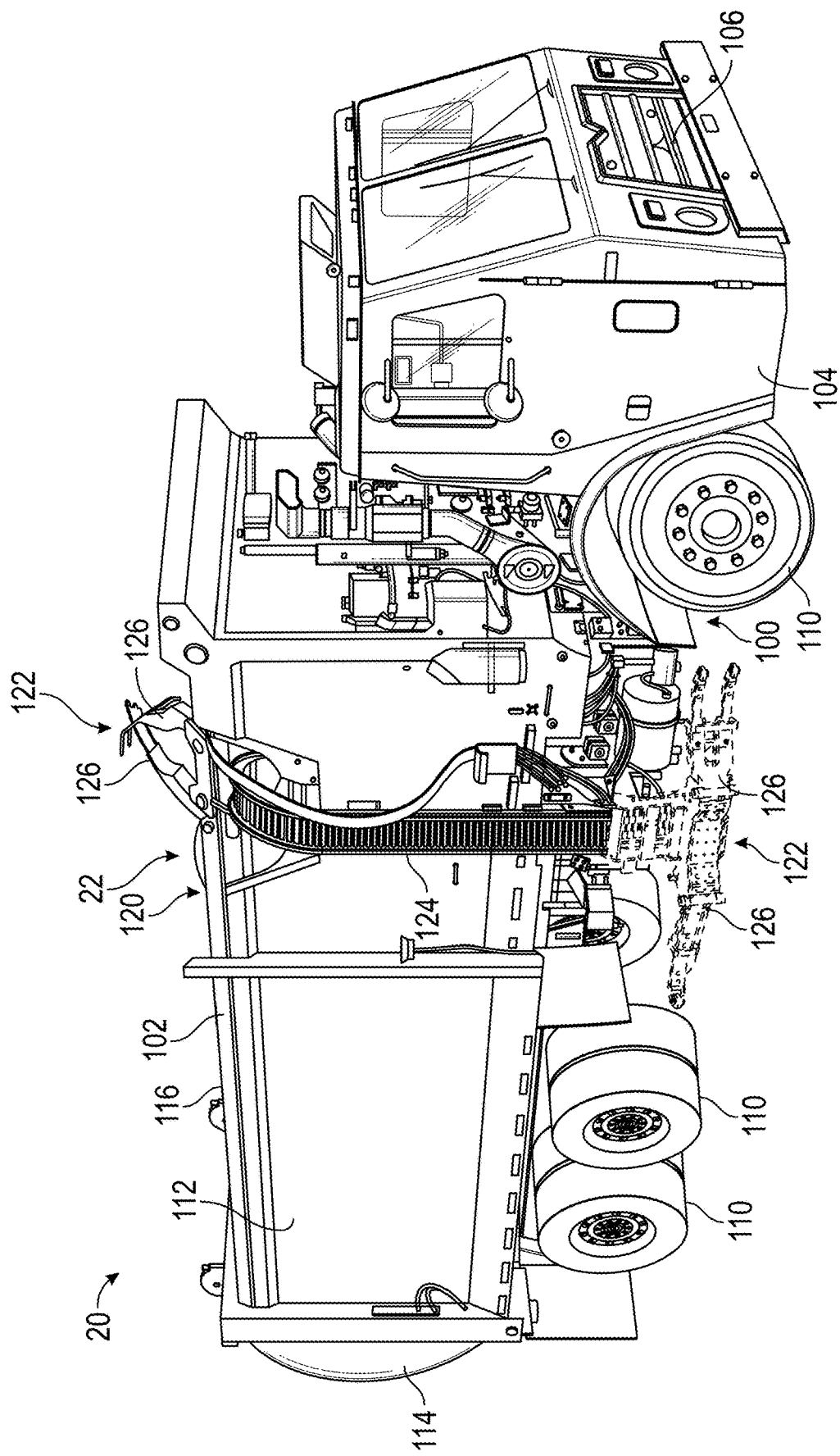
FIG. 2 is a perspective view of a side-loading refuse vehicle, according to an exemplary embodiment.
Figure 3:
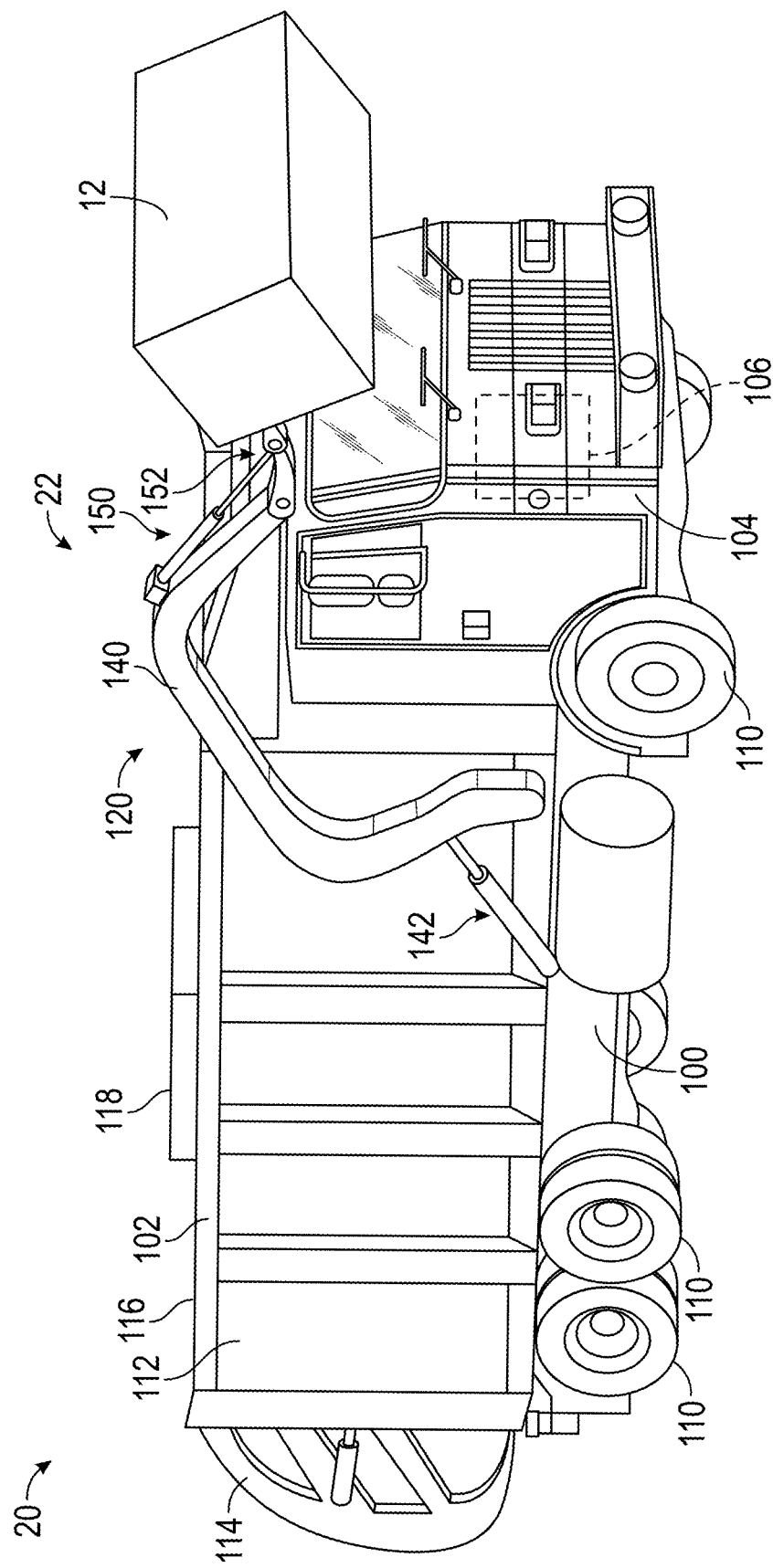
FIG. 3 is a perspective view of a front-loading refuse vehicle, according to an exemplary embodiment.

Referring now to FIGS. 2 and 3, a refuse vehicle 20 is shown, according to various embodiments. The refuse vehicle 20 may be a garbage truck, a waste collection truck, a sanitation truck, etc., and may be configured as a side-loading refuse truck (e.g., as shown in FIG. 2), front-loading refuse truck (e.g., as shown in FIG. 3), or a rear-loading refuse truck. In other embodiments, the refuse vehicle 20 is another type of vehicle (e.g., a skid-loader, a telehandler, a plow truck, a boom lift, etc.). As shown, the refuse vehicle 20 includes a chassis, shown as frame 100; a body assembly, shown as body 102, coupled to the frame 100 (e.g., at a rear end thereof, etc.); and a cab, shown as cab 104, coupled to the frame 100 (e.g., at a front end thereof, etc.). The cab 104 may include various components to facilitate operation of the refuse vehicle 20 by an operator, such as seats, steering wheels, hydraulic controls, graphical user interfaces (e.g., a touchscreen user interface), switches, buttons, dials, etc. In other embodiments, the refuse vehicle 20 is an autonomous or semi-autonomous vehicle. In such embodiments, the refuse vehicle 20 may operate partially or entirely without direct operator control.

As shown, the refuse vehicle 20 includes a prime mover, shown as engine 106, coupled to the frame 100 at a position beneath the cab 104. The engine 106 is configured to provide power to a series of tractive elements, shown as wheels 110, and/or to other systems of the refuse vehicle 20 (e.g., a pneumatic system, a hydraulic system, etc.). The engine 106 may be configured to utilize one or more of a variety of fuels (e.g., gasoline, diesel, bio-diesel, ethanol, natural gas, etc.), according to various exemplary embodiments. According to an alternative embodiment, the prime mover additionally or alternatively includes one or more electric motors coupled to frame 100 (e.g., a hybrid refuse vehicle, an electric refuse vehicle, etc.). The electric motors may consume electrical power from an on-board storage device (e.g., batteries, ultracapacitors, etc.), from an on-board generator (e.g., an internal combustion engine, etc.), and/or from an external power source (e.g., overhead power lines, etc.) and provide power to the systems of the refuse vehicle 20.

In some embodiments, the refuse vehicle 20 is configured to transport refuse from various waste receptacles within a municipality to a storage and/or processing facility (e.g., a landfill, an incineration facility, a recycling facility, etc.). As shown, the body 102 includes a plurality of panels, shown as panels 112, a tailgate 114, and a cover 116. In some embodiments, as shown in FIG. 3, the body 102 further includes a door, shown as top door 118, which is movably coupled along the cover 116 to seal the opening thereby preventing refuse from escaping the refuse compartment 120 (e.g., due to wind, bumps in the road, etc.). The panels 112, the tailgate 114, the cover 116, and/or the door 118 define a collection chamber (e.g., hopper, etc.), shown as refuse compartment 120. Loose refuse may be placed into the refuse compartment 120 where it may thereafter be compacted. The refuse compartment 120 may provide temporary storage for refuse during transport to a waste disposal site and/or a recycling facility. In some embodiments, at least a portion of the body 102 and the refuse compartment 120 extend in front of the cab 104. In some embodiments, the body 102 and the refuse compartment 120 are positioned behind the cab 104.

In some embodiments, the refuse compartment 120 includes a hopper volume and a storage volume. Refuse may be initially loaded into the hopper volume and thereafter compacted into the storage volume. According to an exemplary embodiment, the hopper volume is positioned between the storage volume and cab 104 (i.e., refuse is loaded into a position of the refuse compartment 120 behind the cab 104 and stored in a position further toward the rear of the refuse compartment 120). In other embodiments, the storage volume is positioned between the hopper volume and the cab 104 (e.g., a rear-loading refuse vehicle, etc.).

As shown in FIG. 2, the refuse vehicle 20, when configured as a side-loading refuse vehicle, may include a collector 22 configured as a side-loading lift mechanism/system (i.e., a side-loading lift assembly). The collector 22 includes a grabber assembly, shown as grabber assembly 122, slidably coupled to a guide, shown as track 124, and configured to move along an entire length of the track 124. The track 124 is shown to extend along substantially an entire height of the body 102 and is configured to cause the grabber assembly 122 to tilt or rotate near an upper height of the body 102. In other embodiments, the track 124 extends along substantially an entire height of the body 102 on a rear side of the body 102.

The grabber assembly 122 is shown to include a pair of actuators, shown as actuators 126. The actuators 126 are configured to releasably secure a refuse container (e.g., the refuse container 12) to the grabber assembly 122, according to an exemplary embodiment. The actuators 126 are selectively repositionable (e.g., individually, simultaneously, etc.) between an engaged position or state and a disengaged position or state. In the engaged position, the actuators 126 are rotated towards one other such that the refuse container may be grasped therebetween. In the disengaged position, the actuators 126 rotate outwards (e.g., as shown in the bottom position of FIG. 2) such that the refuse container is not grasped by the actuators 126. By transitioning between the engaged position and the disengaged position, the actuators 126 releasably couple the refuse container to the grabber assembly 122. In some embodiments, the grabber assembly 122 is configured to engage an upright residential garbage can (e.g., as shown in FIG. 1).

In operation, the refuse vehicle 20 of FIG. 2 may pull up alongside the refuse container, such that the refuse container is positioned to be grasped by the grabber assembly 122 therein. The grabber assembly 122 may then transition into an engaged state to grasp the refuse container. After the refuse container has been securely grasped, the grabber assembly 122 may be transported along the track 124 (e.g., by an actuator) with the refuse container. When the grabber assembly 122 reaches the end of the track 124, the grabber assembly 122 may tilt and empty the contents of the refuse container into the refuse compartment 120. The tilting is facilitated by the path of the track 124. When the contents of the refuse container have been emptied into the refuse compartment 120, the grabber assembly 122 may descend along the track 124 and return the refuse container to the ground. Once the refuse container has been placed on the ground, the grabber assembly 122 may transition into the disengaged state, releasing the refuse container.

As shown in FIG. 3, the refuse vehicle 20, when configured as a front-loading refuse vehicle, may include a collector 22 configured as a front-loading lift assembly. The collector 22 includes a pair of arms, shown as lift arms 140, coupled to the frame 100 and/or the body 102 on either side of the refuse vehicle 20 such that the lift arms 140 extend forward of the cab 104 (e.g., a front-loading refuse vehicle, etc.). In other embodiments, the collector 22 extends rearward of the body 102 (e.g., a rear-loading refuse vehicle, etc.). In still other embodiments, the collector 22 extends from a side of the body 102 (e.g., a side-loading refuse vehicle, etc.). The lift arms 140 may be rotatably coupled to frame 100 with a pivot (e.g., a lug, a shaft, etc.). As shown, the collector 22 includes first actuators, shown as lift arm actuators 142 (e.g., hydraulic cylinders, etc.), coupled to the frame 100 and the lift arms 140. The lift arm actuators 142 are positioned such that extension and retraction thereof rotates the lift arms 140 about an axis extending through the pivot, according to an exemplary embodiment. As shown, the collector 22 further includes a second set of actuators shown as fork actuators 150. The fork actuators 150 are configured to rotate a pair of interfaces devices or end effectors, shown as forks 152, relative to the lift arms 140. The forks 152 are configured to interface with a front-loading refuse container 12. As shown, the refuse container 12 is a dumpster that receives the forks 152 to couple the refuse container 12 to the refuse vehicle 20. In some embodiments, the refuse vehicle 20 includes an adapter for the collector 22 that converts the front-loading refuse vehicle 20 into a side-loading refuse vehicle. The adapter may include an arm that interfaces with side-loading refuse containers (e.g., similar to the grabber assembly 122). The adapter may dump the refuse container 12 into an intermediate basket, which is subsequently dumped into the refuse compartment 120 by the lift arm actuators 142.

Referring to FIG. 4, a control system 170 of the refuse vehicle 20 is shown according to an exemplary embodiment. The control system 170 includes a controller, shown as vehicle controller 172. The vehicle controller 172 is configured to control various aspects of the operation of the refuse vehicle 20 and to communicate with one or more other devices in the system 10. The vehicle controller 172 includes a processing circuit, shown as processor 174, and a memory device, shown as memory 176.

The vehicle controller 172 is operatively coupled to (e.g., in communication with, configured to control, configured to provide data to, configured receive data from, etc.) the engine 106 and the collector 22. In some embodiments, the vehicle controller 172 is operatively coupled to steering and braking systems 179 (e.g., a steering system and/or brakes, etc.) of the refuse vehicle 20. Through control over the engine 106 and the steering and braking systems 179, the vehicle controller 172 may control movement of the refuse vehicle 20 partially or completely autonomously. By way of example, the vehicle controller 172 may control the engine 106 and/or the steering and braking systems 179 to move the refuse vehicle 20 into alignment with a refuse container, and the control the collector 22 to engage and dump the refuse container 12.

Referring to FIGS. 1 and 4, the control system 170 includes a communication interface 180 (e.g., a network interface, an antenna, etc.) operatively coupled to the vehicle controller 172 to facilitate communication between the vehicle controller 172 and one or more other devices. By way of example, the communication interface 180 may communicate directly or indirectly with one or more other refuse vehicles 20, one or more drones 30, the service manager 40, the customer devices 50, or other devices. In some embodiments, the communication interface 180 communicates wirelessly. By way of example, the communication interface 180 may utilize a cellular network, Bluetooth, near field communication (NFC), infrared communication, radio, or other types of wireless communication. In other embodiments, the communication interface 180 utilizes wired communication. In some embodiments, the communication interface 180 communicates with other devices over a network (e.g., a local area network, a wide area network, the Internet, etc.).

Referring to FIG. 4, the control system 170 further includes a user interface (e.g., an operator interface, an input device, a data output device, etc.), shown as user interface 182, operatively coupled to the vehicle controller 172. The user interface 182 may be configured to receive information (e.g., commands, selections, etc.) from an operator and/or provide information to the operator. The user interface 182 may include input devices, such as touch screens, buttons, microphones, switches, knobs, pedals, wheels, or other components. The user interface 182 may include output devices, such as displays, speakers, haptic feedback devices, lights, or other components. In some embodiments, the user interface 182 additionally or alternatively includes one or more user devices (e.g., smartphones, tablets, laptops, etc.). The vehicle controller 172 may utilize the user interface 182 to facilitate operator control over the refuse vehicle 20 and/or the drone 30.

Referring again to FIG. 4, the control system 170 further includes a location sensor, shown as vehicle GPS 184, operatively coupled to the vehicle controller 172. The vehicle GPS 184 is configured to provide location data indicative of a current location of the refuse vehicle 20. The vehicle controller 172 may utilize this location data to provide location guidance (e.g., directions) to the operator as they travel along the route. By way of example, the vehicle controller 172 may use the location data to provide turn-by-turn instructions (e.g., through the user interface 182) to guide the operator along the route. By way of another example, the vehicle controller 172 may use the location data to determine when the refuse vehicle 20 is approaching and/or has reached a stop along the route.

In some embodiments, the refuse vehicle 20 includes an interface, shown as drone dock 190, configured to interact with one or more of the drones 30. The drone dock 190 may act as a staging area and/or storage area for the drones 30, permitting the drones 30 to take off from and land on the refuse vehicle 20. This may occur while the refuse vehicle 20 is stationary, or while the refuse vehicle 20 is in motion. In some embodiments, the drone dock 190 is operatively coupled to one or more power sources (e.g., batteries, generators, etc.) located onboard the refuse vehicle 20. When a drone 30 is engaged with the drone dock 190, the drone 30 may be charged by the one or more power sources. In some embodiments, the system 10 includes two or more drones 30 for reach refuse vehicle 20. While a certain subset of these drones 30 may be positioned remotely from the refuse vehicle 20 (e.g., surveilling one or more stops along the route), the remaining drones 30 may remain engaged with the drone dock 190 and charging. In this way, the drones 30 can alternate in and out of the drone dock 190, facilitating continuous operation of the system 10.

Drone

Referring to FIGS. 1 and 5, the drone 30 is shown according to an exemplary embodiment. The drone 30 is configured to travel to one or more areas (e.g., stops) along a route of the vehicle and gather information (e.g., surveil the one or more areas). The information may include status information for the route (e.g., identifying a potential blockage along a road that would require rerouting the refuse vehicle 20). The information may additionally or alternatively include status information regarding one or more refuse containers 12. The drone 30 may then relay this information to the service manager.

The drone 30 includes a chassis, shown as frame 200, configured to support the various components of the drone 30. Coupled to the frame 200 is a propulsion unit or drivetrain, shown as motive driver 210, configured to propel and/or steer the drone 30. In the embodiment shown in FIG. 1, the drone 30 is a flying drone, and the motive driver 210 includes a series of propellers powered by a series of motors. The propellers lift the drone 30 off of the ground and propel the drone 30 laterally. The drone 30 may be steered by varying the power supplied to each propeller. Air-based drones may include wings, flaps, rudders, or other elements to facilitate lift production and/or steering. In other embodiments, the drone 30 is a land-based drone (e.g., an automobile, etc.) and the motive driver 210 includes a drive train (e.g., a series of tractive elements) configured to propel and steer the drone 30 along the ground. In yet other embodiments, the drone 30 is a sea-based drone (e.g., a boat, a submarine, etc.), and the motive driver 210 includes one or more propellers and/or rudders that facilitate propulsion and/or steering through a liquid (e.g., water). The motive driver 210 is configured to consume energy provided by (i.e., is powered at least in part by) a power source 212. The power source 212 may include batteries, capacitors, internal combustion engines, generators, solar panels, fuel cells, or other sources of energy.

In some embodiments, the drone 30 is a remotely-operated vehicle or autonomous vehicle. In such embodiments, the drone 30 may be sized or otherwise configured such that the drone 30 is incapable of accommodating one or more occupants. In other embodiments, the drone 30 is capable of transporting one or more occupants. By way of example, the drone 30 may be an automobile (e.g., a truck, a car, etc.). In such an embodiment, the drone 30 may utilize data available from a self-driving system of a vehicle. By way of example, the system 10 may utilize data from one or more self-driving vehicles that drive through the area surrounding the route of the refuse vehicle 20. Such data may be passively available from the vehicles within this area without the drivers of the vehicles following a route directed by the system 10.

Referring to FIG. 5, a control system 250 of the drone 30 is shown according to an exemplary embodiment. The control system 250 includes a controller, shown as drone controller 252. The drone controller 252 is configured to control various aspects of the operation of the drone 30 and to communicate with one or more other devices in the system 10. The drone controller 252 includes a processing circuit, shown as processor 254, and a memory device, shown as memory 256.

The drone controller 252 is operatively coupled to (e.g., in communication with, configured to control, configured to provide data to, configured receive data from, etc.) the motive driver 210 and the power source 212. Through control over the motive driver 210 and/or the power source 212, the drone controller 252 may control movement of the drone 30 partially or completely autonomously. By way of example, the drone controller 252 may control the motive driver 210 to move the drone 30 between different stops along a route of a corresponding refuse vehicle 20. The motive driver 210 may be used to move the drone 30 around an area surrounding a stop to permit surveillance of the area to identify refuse containers.

Referring to FIGS. 1 and 4, the control system 250 includes a communication interface 260 (e.g., a network interface, an antenna, etc.) operatively coupled to the drone controller 252 to facilitate communication between the drone controller 252 and one or more other devices. By way of example, the communication interface 260 may communicate directly or indirectly with one or more refuse vehicles 20, one or more other drones 30, the service manager, the customer devices 50, or other devices. The communication interface 260 may be substantially similar to the communication interface 180 except as otherwise specified herein.

Referring again to FIG. 5, the control system 250 further includes a location sensor, shown as drone GPS 270, operatively coupled to the drone controller 252. The drone GPS 270 is configured to provide location data indicative of a current location of the drone 30. The drone controller 252 may utilize this location data to identify the corresponding location of the refuse container 12. By way of example, when the drone 30 identifies a refuse container, the drone controller 252 may store location data corresponding to location of the drone 30 when the refuse container is identified.

The control system 250 further includes a first sensor (e.g., a container sensor, a mapping sensor, an image sensor, etc.), shown as camera 272. The camera 272 is configured to generate data (e.g., generated data, status data, image data, etc.) indicating a status of the refuse container 12 and/or other objects (e.g., obstacles that obstruct movement of the refuse container 12 and/or the refuse vehicle 20). Specifically, the camera 272 is configured to provide image data illustrating an area around the drone 30. The camera 272 is coupled to the frame 200. In the embodiment of FIG. 1, the drone 30 is an aerial drone, and the camera 272 is oriented downward to view an area below the drone 30. The image data from the camera 272 may include one or more still images or video. The image data may indicate shapes, sizes, textures, colors, orientations, positions, and/or colors of objects. In some embodiments, the images are captured in color. In other embodiments, the image data is monochromatic (e.g., black and white).

In some embodiments, the control system 250 additionally or alternatively includes one or more sensors (e.g., container sensors, obstacle sensors, mapping sensors, object detection sensors, etc.), shown as mapping sensor 274. The mapping sensor 274 is configured to generate status data indicating a status of the refuse container 12 and/or other objects. The data generated by the mapping sensor 274 may be used to replace and/or supplement the data generated by the camera 272. In some embodiments, the mapping sensor 274 includes a light detection and ranging (LIDAR) sensor configured to provide a point map of the positions of various surfaces near the drone 30. In some embodiments, the mapping sensor 274 includes an ultrasonic sensor configured to provide distance data between the drone 30 and an object or surface. In some embodiments, the mapping sensor 274 includes a transmitter and/or receiver that are configured to communicate (e.g., using radio frequency identification (RFID)) with a transponder of a refuse container, providing transponder communication data indicating when the drone 30 is in close enough proximity to the refuse container 12 to initiate such a communication.

Service Manager

Figure 6:
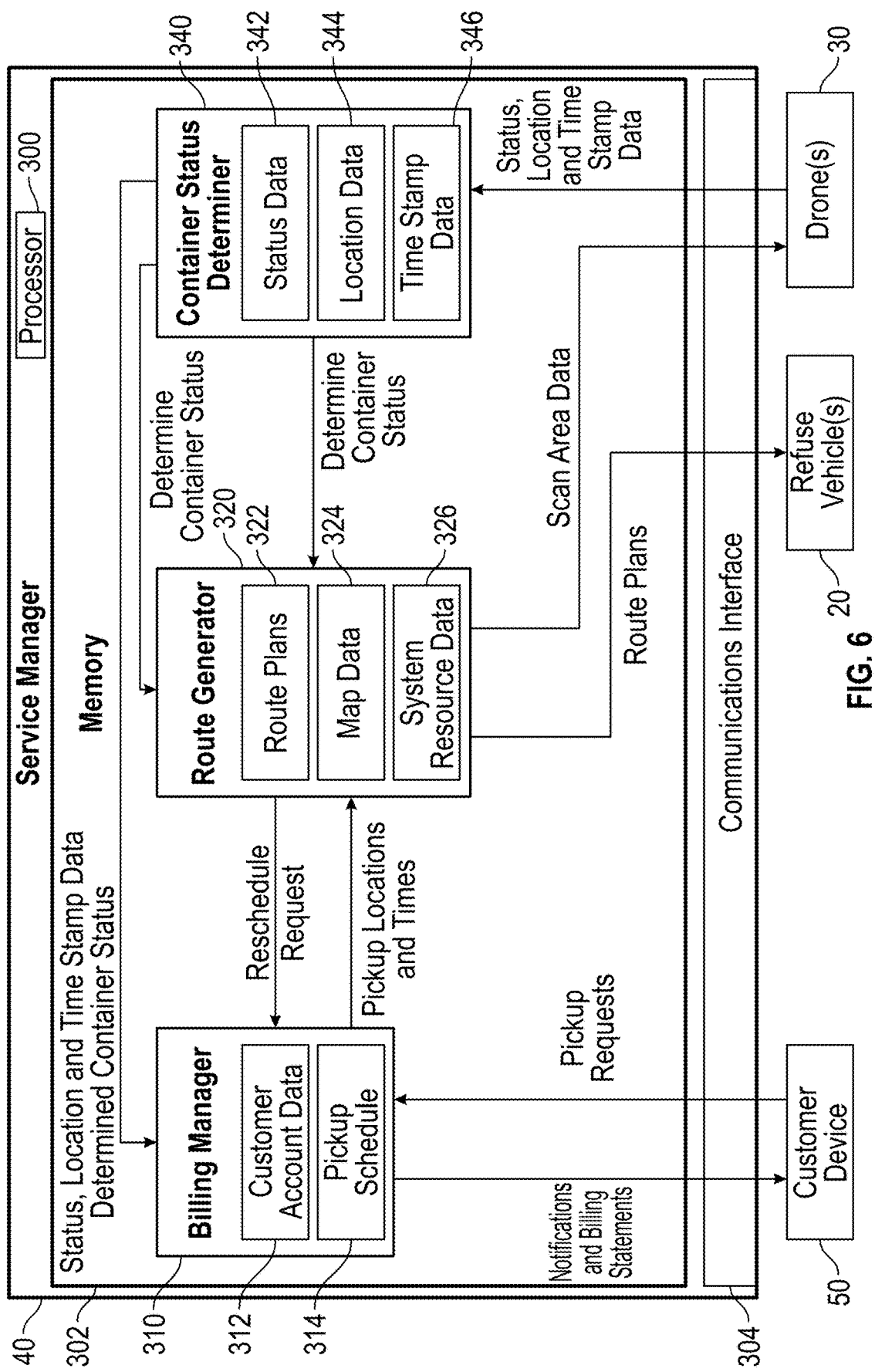
FIG. 6 is a block diagram of the service manager of FIG. 1.

Referring to FIG. 6, the service manager 40 is shown according to an exemplary embodiment. In some embodiments, the service manager 40 is a cloud device (e.g., a cloud server). The service manager 40 may include a single device (e.g., a single server) or multiple devices. As shown in FIG. 6, the service manager 40 includes a processing circuit, shown as processor 300, and a memory device, shown as memory 302. The memory 302 may store instructions that, when executed by the processor 300, cause the service manager 40 to perform one or more functions of the system 10 described herein. The service manager 40 further includes a communication interface 304 (e.g., a network interface, an antenna, etc.) configured to facilitate communication between the service manager 40 and one or more other devices. By way of example, the communication interface 304 may communicate directly or indirectly with one or more refuse vehicles 20, one or more other drones 30, other parts of the service manager 40 (e.g., operatively coupling multiple servers), the customer devices 50, or other devices. The communication interface 304 may be substantially similar to the communication interface 180 except as otherwise specified herein.

As shown in FIG. 6, the memory 302 includes a first module, shown as billing manager 310. The billing manager 310 is configured to manage communications to and from the customer. By way of example, the billing manager 310 may communicate with the customer through a customer device 50. Such communications may utilize phone calls, text messages, emails, notifications in an application, or other forms of electronic communication. When receiving a communication, the billing manager 310 may request identification information (e.g., a username and password) from a customer to confirm the identity of the customer. By way of another example, the billing manager 310 may communicate with the customer through a non-electronic communication. In some such embodiments, the billing manager 310 is configured to control the production and mailing of paper communications (e.g., through a postal service).

The billing manager 310 is configured to store customer account data 312 associated with each customer. The customer account data 312 may include biographical information associated with the customer, such as their name, gender, and history of using the refuse collection service. The customer account data 312 may include location data (e.g., an address, a global coordinate, etc.) identifying one or more stops associated with the customer. The customer account data 312 may include billing information, such as a current account balance, preferred payment information (e.g., bank account information, credit card information, etc.), payment schedule, and the terms of their current service contract. The billing manager 310 may utilize the customer account data 312 to generate billing statements for each customer. The billing manager 310 may communicate the billing statements to the customer on a regular basis.

The billing manager 310 may store a pickup schedule 314 for each customer. The pickup schedule 314 may specify a date and/or time that the customer wishes to have refuse collected from one or more stops associated with the customer. The pickup schedule 314 may be based on a cyclical schedule (e.g., requiring a biweekly or monthly pickup), and/or the pickup schedule 314 may include individual pickups (e.g., as requested by a user). The pickup schedule 314 may be updated in accordance with pickup requests received from customer devices 50.

Referring still to FIG. 6, the memory 302 further includes a second module, shown as route generator. The route generator 320 is configured to manage operation of the refuse vehicles 20 and the drones 30 based on the pickup schedule 314. Specifically, the billing manager 310 may utilize the customer account data 312 and the pickup schedule 314 to identify a list of pickup locations and times associated with a given time period (e.g., a day, a week, etc.), and the route generator 320 may control the refuse vehicles 20 and the drones 30 based on the provided. pickup locations and times.

The route generator 320 generates and stores route plans 322 for each refuse vehicle 20. Each route plan 322 may include a route (e.g., a turn-by-turn navigation path along which the refuse vehicle 20 is instructed to travel), one or more stops (e.g., addresses, global coordinates, etc.) where the refuse vehicle 20 is instructed to collect refuse, and/or an estimated schedule for each event along the route. The route generator 320 may utilize stored map data 324 (e.g., associated with roads, obstacles, landmarks, stops, etc.) when generating each route plan 322. Once the route plans 322 have been generated, the route generator 320 may push the route plans 322 to the refuse vehicles 20, instructing the refuse vehicles 20 to follow the associated routes. Such instructions may take the form of turn-by-turn navigation instructions shown on the user interface 182 in driver-operated refuse vehicles. The instructions may be executed by the vehicle controller 172 in autonomous refuse vehicles.

In some embodiments, the route generator 320 stores system resource data 326. The system resource data 326 may include a catalog or list of resources available for assignment by the service manager 40. The resources may include refuse vehicles 20, drones 30, operators, or other resources. The system resource data 326 may note the status of each resource (e.g., "available," "already assigned," "under repair," etc.). The system resource data 326 may include information associated with each resource, such a current location of each resource, a capacity of each resource, or a cost to operate each resource. The route generator 320 may utilize the system resource data 326 may utilize the system resource data 326 when generating the route plans 322 to optimize the efficiency of the route plans 322 (e.g., cost efficiency, time efficiency, etc.), while ensuring that the requirements of the pickup schedule 314 are met. If the route generator 320 is unable to meet the requirements of the pickup schedule 314 with the available resources, the route generator 320 may submit a request to the billing manager 310 to reschedule, or the route generator 320 may request additional resources.

Based on the route plans 322, the route generator 320 may generate scan area data for each of the drones 30. The scan area data may include instructions specifying one or more scan areas for each drone 30 to surveil, generating status data that identifies the status of refuse containers 12 within the scan areas. Each drone 30 may utilize its corresponding drone GPS 270 to navigate to the scan area. Once at the scan area, the drones 30 may utilize the cameras 272 and/or the mapping sensors 274 to surveil the scan areas, generating status data associated with refuse containers within the scan area. Depending upon the size of the area covered by the sensors of the drones 30, the drones 30 may move throughout the scan area until status data is generated for the entire scan area.

FIGS. 7-12 illustrate examples of scan areas, according to various embodiments. In each embodiment, a path, shown as road 330, is an area where a refuse vehicle 20 is permitted to travel (e.g., in accordance with regulations or policies, based on the geometry or other specifications of the vehicle, etc.). A point 332 designates a location of a stop identified by the route generator 320. The location of the point 332 may be specified in the location data of the customer account data 312, and may be associated with an address or a global coordinate. A scan area 334 surrounds the point 332. In some embodiments (e.g., FIGS. 7-9), the point 332 is approximately centered on the road 330. In other embodiments, the point 332 is offset from the center of the road 330. The location of the point 332 and the location, size, and shape of the scan area 334 may be specified in the scan area data. In some embodiments, one or more of the location of the scan area 334 relative to the point 332, the size of the scan area 334, or the shape of the scan area 334 may be standardized. By way of example, the drone 30 may be configured to surveil a rectangular scan area 334 of a predetermined length and width and having a predetermined position relative to the road 330 (e.g., extending one foot into the road 330) for each stop.

In the embodiment of FIG. 7, the point 332 is approximately centered on the road 330. The scan area 334 is circular (i.e., has a constant radius) and centered about the point 332, extending on both sides of the road 330. In the embodiment of FIG. 8, the point is approximately centered on the road 330. The scan area 334 is square and centered about the point 332, extending on both sides of the road 330. In the embodiment of FIG. 9, the point 332 is approximately centered on the road 330. The scan area 334 is rectangular, and offset to the right of the point 332. The longest sides of the scan area 334 extend substantially parallel to the road 330. The scan area 334 extends partway across the road 330.

In the embodiment of FIG. 10, the point 332 is offset to the right of the road 330. The scan area 334 is circular and centered about the point 332, extending partway across the road. In the embodiment of FIG. 11, the point 332 is offset to the right of the road 330. The scan area 334 is substantially triangular, increasing in width as the scan area 334 extends away from the point 332 toward the road 330. The scan area 334 extends partway across the road 330. In the embodiment of FIG. 12, the point 332 is offset to the right of the road 330. The scan area 334 is rectangular and extends from the point 332 to the edge of the road 330.

Referring again to FIG. 6, the memory 302 further includes a third module, shown as container status determiner 340. The container status determiner 340 is configured to store and/or utilize status data 342, location data 344, and time stamp data 346 generated by the drones 30 when surveilling a scan area of a stop. Specifically, the container status determiner 340 may utilize the status data to determine a status of a refuse container 12. The container status determiner 340 may utilize the location data 344 to associate the determined container status with a location of the refuse container 12. The container status determiner 340 may utilize the time stamp data 346 to associate the determined container status with a time at which the status data 342 were collected.

The container status determiner 340 may determine the status of a refuse container 12 as one of (a) in condition for a standard pickup, (b) in condition for an extended-length pickup, or (c) not in condition to be picked up (i.e., would result in an incomplete pickup). When the refuse container 12 is in condition for a standard pickup, the refuse container 12 can be picked up and emptied with a standard amount of operator intervention (e.g., the pickup takes a standard amount of time, the operator does not have to exit the vehicle, etc.). When the refuse container 12 is in condition for an extended-length pickup, the refuse container 12 can be emptied, but emptying the refuse container 12 will require greater than the standard amount of operator intervention (e.g., the operator has to exit the vehicle to adjust the position or orientation of the refuse container 12, the operator has to manually control the collector 22 to reposition or reorient the refuse container 12 before the refuse container 12 can be emptied, etc.). When the refuse container 12 is not in condition to be picked up, the refuse container is positioned or oriented such that the refuse container 12 cannot be emptied, even with operator intervention. By way of example, the refuse container 12 may not be in condition for pickup if the refuse container is outside of the scan area of the drone 30 associated with the stop.

The container status determiner 340 may provide the determined container status to the route generator 320 and/or the billing manager 310. Based on the determined container status, the route generator 320 may update the route plans 322 (e.g., to add or remove stops from a route). Based on the determined container status, the billing manager 310 may provide a notification to the customer or adjust the customer account data 312.

Method of Selectively Supplying a Refuse Collection Service to a Customer

Figure 13:
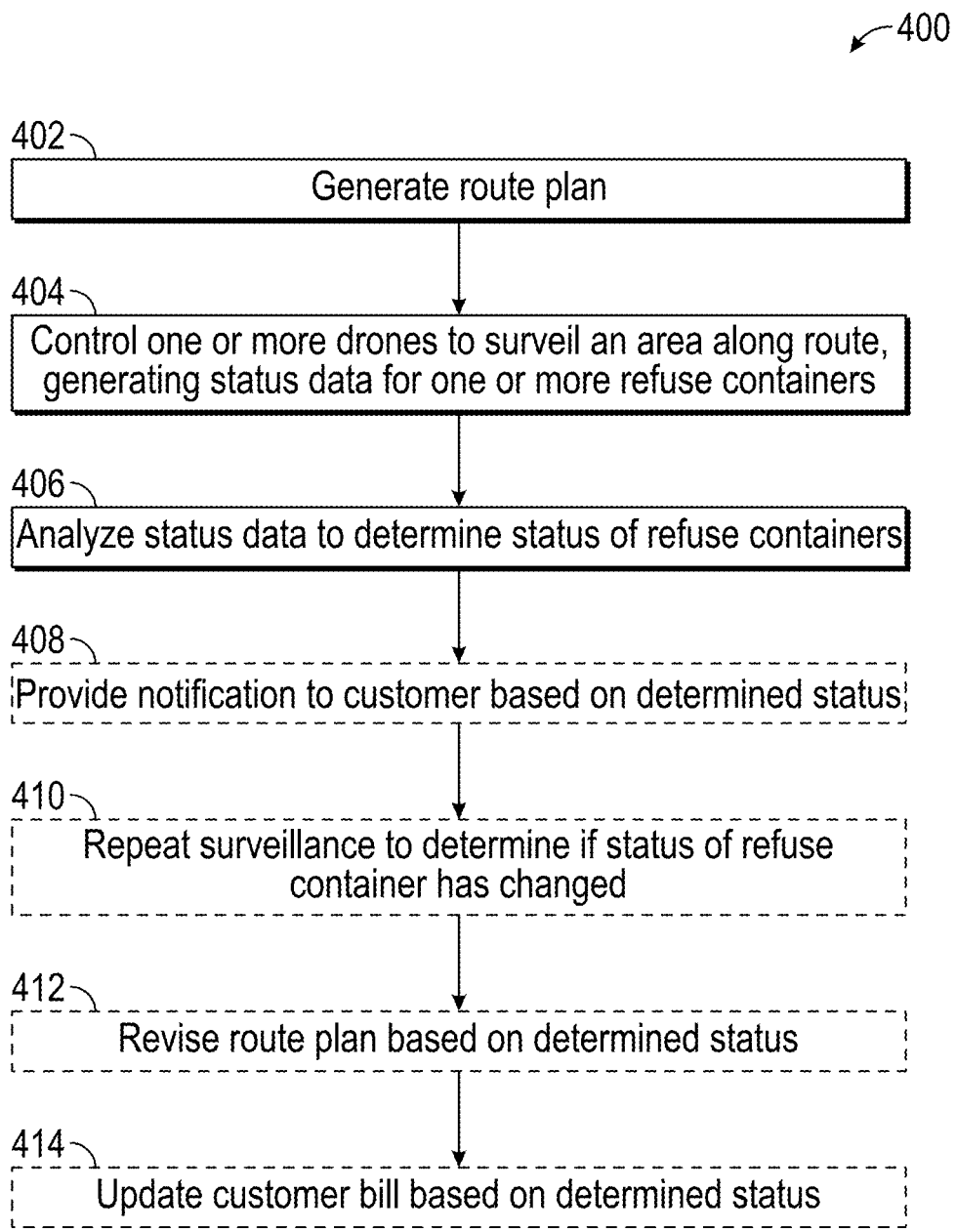
FIG. 13 is block diagram of a process of selectively supplying a refuse collection service to a customer, according to an exemplary embodiment.

Referring to FIG. 13, a method or process for selectively supplying a refuse collection service to a customer (e.g., a method of selectively denying service to a customer) is shown as process 400 according to an exemplary embodiment. The process 400 may be performed by the system 10. Although a certain order of method steps are shown, any of the steps may be repeated, omitted, or reordered except as otherwise specified. Any processing described herein with respect to one device (e.g., the service manager 40) may be performed by another device (e.g., the drone 30). By way of example, image recognition of image data may be performed by the service manager 40, by the refuse vehicle 20, by the drone 30, or by any combination thereof.

Referring to FIGS. 6, and 13, in step 402 the system 10 generates a route plan for one or more refuse vehicles 20. Specifically, the route generator 320 generates route plans 322. To do this, the route generator 320 may utilize data from the billing manager 310. In one embodiment, the billing manager 310 stores customer account data 312 including location data specifying a location where a refuse container 12 associated with each customer should be collected. The billing manager 310 utilizes the location data and the pickup schedule 314 to provide a list of scheduled pickup locations and times for a given time period to the route generator 320. Utilizing map data 324 and system resource data 326, the route generator 320 generates and stores route plans 322 for one or more refuse vehicles 20 to satisfy the pickup schedule 314. In some embodiments, the route generator 320 selects a route plan that optimizes one or more aspects of operation (e.g., minimizing cost, minimizing operational time, minimizing the number of refuse vehicles 20 needed to service a given area, etc.).

In step 404, the system 10 controls one or more drones 30 to surveil an area along a route, generating status data for one or more refuse containers 12. Based on the route plans 322 generated by the route generator 320, the route generator 320 generates scan area data for each drone 30. For one or more of the stops along a route, the scan area data may include location data identifying a location of a scan area associated with the stop, and a size, shape, and orientation of the scan area. The scan area data further includes an instruction for the drone 30 to travel to the scan areas and generate status data throughout the scan area. The drone 30 may autonomously or semi-autonomously perform these instructions, or the drone 30 may be controlled by an operator to perform these instructions. The scan area data may be communicated from the service manager 40 to the drone 30 through the communication interface 304, the communication interface 260, and/or one or more intervening devices (e.g., over a network, through one or more refuse vehicles 20, etc.).

Referring to FIG. 5, to generate the status data, the drone 30 may utilize the camera 272 and/or the mapping sensor 274. When using the camera 272, the drone 30 may record images of the scan area until the entire scan area has been surveilled (e.g., photographed, reviewed, etc.). The images may contain one or more refuse containers 12, a path (e.g., the road 330) along which the refuse vehicle 20 travels, and/or one or more obstacles (e.g., trees, bushes, cars, fire hydrants, humans, etc.). Accordingly, the status data may include image data. When using the mapping sensor 274, the drone 30 may gather information about the scan area in a non-image medium. By way of example, the mapping sensor 274 may include a LIDAR sensor that provides a point map illustrating the topography of surfaces near the drone 30. Accordingly, the status data may include point map data. By way of another example, the mapping sensor 274 may include an ultrasonic sensor that provides a distance between the drone 30 and a surface (e.g., a surface directly below the drone). Accordingly, the status data may include distance data (e.g., height distance data). By way of another example, the mapping sensor 274 may include an emitter and receiver assembly that is configured to identify a transponder (e.g., a radio-frequency identification (RFID) transponder) coupled to the refuse container 12 when in close proximity to the refuse container 12. Accordingly, the status data may include transponder communication data. To the extent that the camera 272 and/or the mapping sensor 274 are unable to cover the entirety of the scan area with the drone 30 positioned in a single location, the drone 30 may move throughout the scanning area until the status data has been generated for the entire scan area.

Throughout generation of the status data, the drone 30 may generate and record location data identifying a location of the drone 30 corresponding to where the status data was recorded. The location data may be provided by the drone GPS 270. Additionally or alternatively, the drone 30 may generate and record time stamp data identifying a time at which the status data was generated. The time stamp data may be provided by a clock of the drone controller 252.

Once a scan area has been fully surveilled by a drone 30, the drone 30 may continue on to other areas and perform a similar process. This is dictated by the instructions provided by the service manager 40 in the scan area data. At any point in time, the drone 30 may communicate the status data, the location data, and/or the time stamp data to the service manager 40, which the data is stored by the container status determiner 340. Specifically, the status data, the location data, and/or the time stamp data may be communicated from the drone 30 to the service manager 40 through the communication interface 260, the communication interface 304, and/or one or more intervening devices (e.g., over a network, through one or more refuse vehicles 20, etc.).

The container status determiner 340 may store the status data 342, the location data 344, and/or the time stamp data 346 for later use. In some instances, it may be advantageous to provide this information to a customer. By way of example, if the customer will be charged an additional fee based on a determined status of a refuse container 12 (e.g., because the customer forgot to take the refuse container 12 out of their home), the service manager 40 may provide status data, location data, and/or time stamp data as proof of this status. By way of example, to reduce the prevalence of contested billing statements, billing statements including additional fees may automatically be accompanied by an image that was used to determine the status of the refuse container (e.g., showing the refuse container 12 in the scan area), location data indicating where the image was taken, and a time stamp indicating when the image was taken. By way of another example, the service manager 40 may be configured to provide the status data, location data, and/or time stamp data associated with the customer in response to a customer request.

In some embodiments, rather than concentrating the surveillance of the drone 30 on scan areas associated with specific stops, the route generator 320 controls one or more drones 30 to patrol a general area, generating status data along the entire way. By way of example, the route generator 320 may instruct a drone 30 to fly along a route that will subsequently be travelled by a refuse vehicle 20, recording status data along the entire route. Such a route may be required to follow available roads, and thus may curve or otherwise deviate from a straight line. By way of another example, the route generator 320 may instruct a series of drones 30 to fly along substantially parallel paths such that a large area is surveilled regardless of the shape of the roads or other land features.

In some embodiments, the drones 30 travel to generate the status data before the refuse vehicles 20 have begun following their routes (e.g., at the beginning of the day). Such an arrangement may be advantageous, as it may provide ample time for the drones 30 to generate data. In other embodiments, the drones 30 and the refuse vehicles 20 operate simultaneously. By way of example, if the drones 30 are deployed from the drone dock 190 on board the refuse vehicle 20, the drones 30 may follow the route of the refuse vehicle 20 immediately before the refuse vehicle 20. This arrangement may be advantageous, as it may provide very up-to-date information.

Referring to FIGS. 6 and 13, in step 406 the system 10 analyzes the status data to determine the status of the corresponding refuse containers 12. Specifically, the container status determiner 340 analyzes the status data to determine the status of each refuse container 12. To accomplish this, the container status determiner 340 may determine certain factors including one or more of (a) if a refuse container 12 is present in a scan area, (b) an orientation of the refuse container 12 relative to a path (e.g., the road 330) where the refuse vehicle 20 will travel, (c) a distance between the path and the refuse container 12, (d) if any obstacles of a size sufficient to obstruct access to the refuse container 12 are present in the scan area, or (e) a location of any such obstacles. Each of these factors may have an impact on the ability of the refuse vehicle 20 or an operator to access a refuse container 12, and accordingly dictate the status of the refuse container 12.

The type of analysis performed by the container status determiner 230 may vary depending on the type of status data provided by the drones 30. Data from different sources may be used redundantly to verify or otherwise improve the reliability of the status determination. Throughout the analysis, the location data 344 may be used to provide additional context to the status data 342. By way of example, the location data 344 may provide the position and orientation of the drone 30 relative to the Earth and/or one or more points of interest (e.g., roads) when the status data were generated. Accordingly, the location data 344 may be used to determine the global position and/or orientation of an object when the status data provides the position and/or orientation of the object relative to the drone 30.

If image data is provided, the container status determiner 340 may perform image recognition to identify one or more characteristics known to correspond to a certain type of object (e.g., a refuse container 12, an obstacle, a road, etc.). Such characteristics may include shape, size, color, reflectivity, or identifying markings (e.g., words, images, QR codes, etc.). Based on what is determined to be shown in the image data, the image data may be used to determine (a) if a refuse container 12 is present in a scan area, (b) an orientation of the refuse container 12 relative to a path (e.g., the road 330) where the refuse vehicle 20 will travel, (c) a distance between the path and the refuse container 12, (d) if any obstacles of a size sufficient to obstruct access to the refuse container 12 are present in the scan area, and (e) a location of any such obstacles.

If point map data is provided, the container status determiner 340 may analyze the topography of the point map to identify one or more characteristics known to correspond to a certain type of object (e.g., a refuse container 12, an obstacle, a road, etc.). Such characteristics may include shape or size. Based on what is determined to be shown in the point map data, the point map data may be used to determine (a) if a refuse container 12 is present in a scan area, (b) an orientation of the refuse container 12 relative to a path (e.g., the road 330) where the refuse vehicle 20 will travel, (c) a distance between the path and the refuse container 12, (d) if any obstacles of a size sufficient to obstruct access to the refuse container 12 are present in the scan area, and (e) a location of any such obstacles.

If distance data is provided, the container status determiner 340 may analyze the distance data and the corresponding location data indicating where the drone 30 was when the distance data was recorded to identify one or more characteristics known to correspond to a certain type of object (e.g., a refuse container 12, an obstacle, a road, etc.). Such characteristics may include shape or size. Based on what is determined to be shown in the distance data, the point map data may be used to determine (a) if a refuse container 12 is present in a scan area, (b) an orientation of the refuse container 12 relative to a path (e.g., the road 330) where the refuse vehicle 20 will travel, (c) a distance between the path and the refuse container 12, (d) if any obstacles of a size sufficient to obstruct access to the refuse container 12 are present in the scan area, and (e) a location of any such obstacles.

If transponder communication data is provided, the container status determiner 340 may analyze whether or not the drone 30 is able to communicate with a transponder at various locations to identify the location of the refuse container 12.

Figure 14:
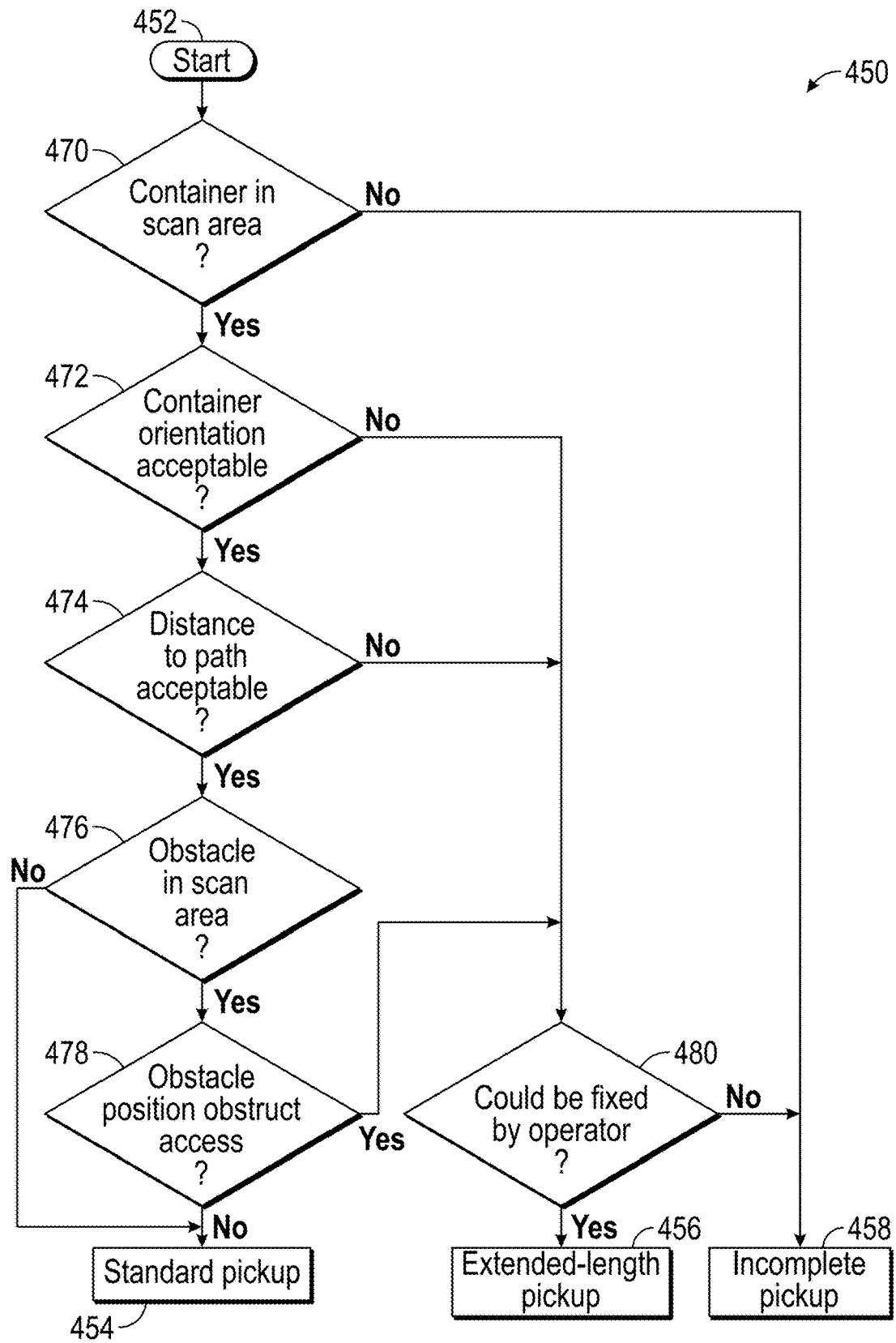
FIG. 14 is a block diagram of a process for determining a status of a refuse container used in the process of FIG. 13.

A process for determining a status based on these factors, is shown in FIG. 14 as a process 450. This process may be performed by the container status determiner 340. The process begins at step 452 and ends by one of (a) determining that the refuse container 12 is in condition for a standard pickup, at step 454, (b) determining that the refuse container 12 is in condition for an extended-length pickup, at step 456, or (c) determining that the refuse container 12 is not in condition to be picked up (i.e., would result in an incomplete pickup), at step 458.

After the process 450 begins in step 452, step 452 includes determining whether or not one or more refuse containers 12 are present in the scan area. If it is determined that no refuse containers 12 are present in the scan area, the process 450 proceeds to step 458, where it is determined that the refuse container 12 is not in condition to be picked up.

If it is determined that one or more refuse containers 12 are present in the scan area, the process 450 proceeds to step 452. Step 452 includes determining whether or not an orientation of the refuse container 12 is within an acceptable range. The acceptable range of orientations may be a range of orientations that facilitates successful emptying of the refuse container 12 by the collector 22 of the refuse vehicle 20. The orientation may be measured relative to a predicted orientation of the refuse vehicle 20 (e.g., based on a trajectory of a path followed by the refuse vehicle 20). The orientation may be measured as an angular orientation about one or more axes (e.g., a vertical axis, a lateral axis, a longitudinal axis, etc.). The acceptable range may include separate acceptable ranges of orientations about each axis (e.g., a first acceptable range measured about the vertical axis, a second acceptable range measured about the lateral axis, etc.). Each acceptable range may be centered about an optimal orientation (e.g., the acceptable range may be ±X degrees about each axis from an upright orientation in which a front wall of the refuse container 12 faces the refuse vehicle 20, where X is a predetermined value, such as 10, 15, 20, etc.).

If it is determined that the refuse container 12 is in an acceptable orientation, the process 450 proceeds to step 454. Step 454 includes determining whether or not a distance from the refuse container 12 to the path followed by the refuse vehicle 20 is within an acceptable range. The acceptable range of distances may be a range of distances that facilitate engagement of the collector 22 with the refuse container 12. The range of distances may be driven by a reach of the collector 22 (e.g., a distance that the collector 22 can extend outward). By way of example, the range of distances may be between 0 and 4 feet, between 0 and 6 feet, between 0 and 8 feet, etc.

If it is determined that the refuse container 12 is an acceptable distance from the path, the process 450 proceeds to step 456. Step 456 includes determining whether or not an obstacle of sufficient size to obstruct interaction with the refuse container 12 is present in the scan area. If it is determined that an obstacle is not present in the scan area, the process 450 proceeds to step 454, where the refuse container 12 is determined to be in condition for a standard pickup. If it is determined that an obstacle is present in the can area, the process proceeds to step 458. Step 458 includes determining whether or not a position of the detected obstacle causes the obstacle to obstruct access by the refuse vehicle 20 and/or an operator to the refuse container 12. An example of a position where the obstacle would obstruct the refuse container 12 is a situation where the obstacle extends directly between the refuse container 12 and the path followed by the refuse vehicle 20. If it is determined that the obstacle does not obstruct access to the refuse container 12, the process 450 proceeds to step 454, where the refuse container 12 is determined to be in condition for a standard pickup.

If it is determined that (a) the orientation of the refuse container 12 is not in the acceptable range, (b) the distance from the refuse container 12 to the path followed by the refuse vehicle 20 is outside the acceptable range, or (c) the obstacle is positioned such that it obstructs access to the refuse container 12, the process 450 proceeds to step 480. Step 480 includes determining whether or not the issue that prevented a standard pickup of the refuse vehicle 20 could be addressed by direct intervention of an operator (e.g., the operator exiting the vehicle and repositioning the refuse container 12). If it is determined that the issue could be addressed by operator intervention, the process proceeds to step 456, where the refuse container 12 is determined to be in condition for an extended-length pickup. If it is determined that the issue could not be addressed with operator intervention, the process proceeds to step 458, where it is determined that the refuse container 12 is not in condition to be picked up.

FIGS. 15-19 illustrate various situations that a refuse vehicle 20 configured as a side-loading refuse vehicle may experience when attempting to collect refuse from a refuse container 12 at a stop. In each of these embodiments, a path along which the refuse vehicle 20 travels when completing the route is shown as road 500. The road 500 has an edge or boundary, shown as curb 502, extending along a length of the road 500. In each of these figures, the scan area may extend to the right of the curb 502.

Figure 16:
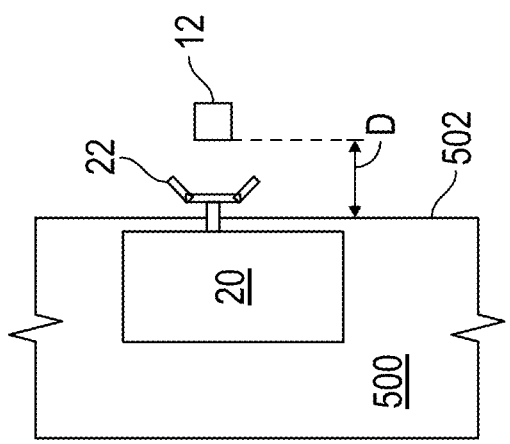
Figure 15:
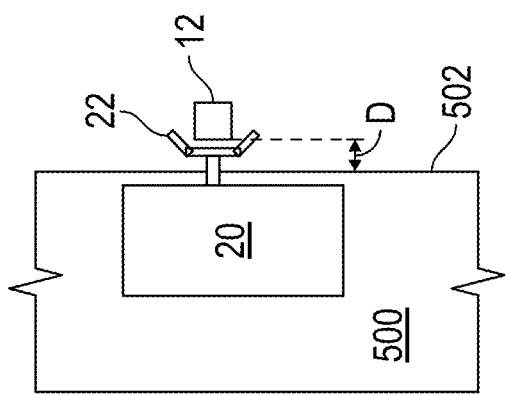

In the situation of FIG. 15, the refuse container 12 is placed a distance D away from the curb 502. This distance is within the acceptable range, such that the collector 22 is able to engage the refuse container 12 while the refuse vehicle 20 is in the road 500. In this situation, the container status determiner 340 determines that the status of the refuse container 12 permits a standard pickup. In FIG. 16, the distance D is increased outside of the acceptable range, such that the collector 22 is unable to reach the refuse container 12. The refuse container 12 could be moved into the range of the collector 22 by an operator. Accordingly, the container status determiner 340 determines that the status of the refuse container 12 requires an extended-length pickup.

Figure 17:
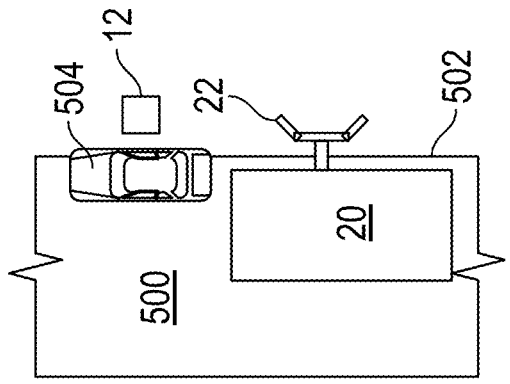
FIGS. 15-18 are top views of a side-loading refuse vehicle attempting to engage a refuse container, according to various embodiments.

In FIG. 17, an obstacle, shown as car 504, is obstructing the refuse container 12. The car 504 extends directly between the refuse container 12 and the road 500. The car 504 is thus sized and positioned such that the car 504 prevents the collector 22 from accessing the refuse container 12. However, the refuse container 12 could be moved around the car 504 and into the range of the collector 22 by an operator. Accordingly, the container status determiner 340 determines that the status of the refuse container 12 requires an extended-length pickup.

Figure 18:
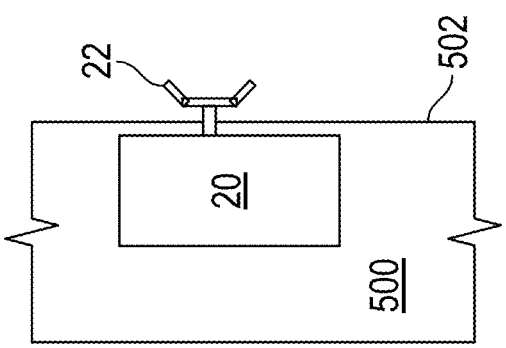

In FIG. 18, no refuse containers are present in the scan area. Accordingly, no refuse containers are available for pickup, regardless of whether or not the operator were to intervene. As such, the container status determiner 340 determines that the status of refuse containers in the scan area prevents a pickup at that stop.

Figure 19:
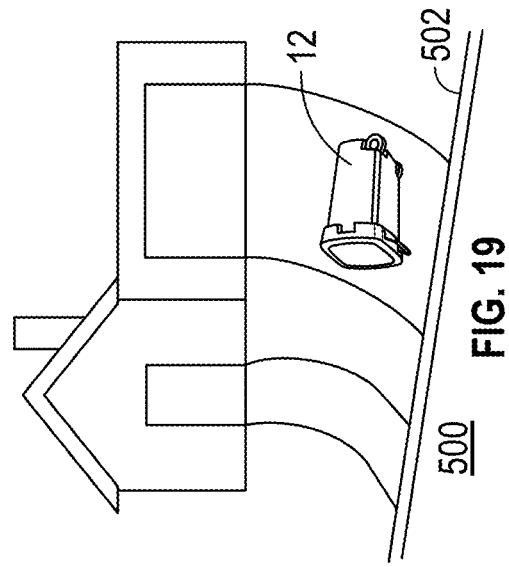
FIG. 19 is a perspective view of a refuse container, according to an exemplary embodiment.

In FIG. 19, a refuse container 12 has fallen over onto its side (e.g., due to the wind). The orientation of this refuse container 12 about a lateral axis is outside of an acceptable range such that the refuse container 12 cannot be engaged by the collector 22. However, the refuse container 12 could be reoriented back into an upright orientation and moved into the range of the collector 22 by an operator. Accordingly, the container status determiner 340 determines that the status of the refuse container 12 requires an extended-length pickup.

Figure 20:
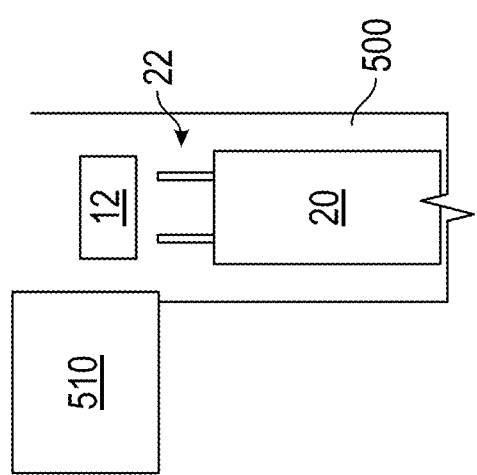

FIGS. 20-23 illustrate various situations that a refuse vehicle 20 configured as a front-loading refuse vehicle may experience when attempting to collect refuse from a refuse container 12 at a stop. In the situation of FIG. 20, the refuse container 12 is placed adjacent a structure, shown as building 510. The refuse container 12 is positioned in the road 500 and oriented such that the refuse vehicle 20 can drive straight into engagement with the refuse container 12. In this situation, the container status determiner 340 determines that the status of the refuse container 12 permits a standard pickup.

Figure 21:
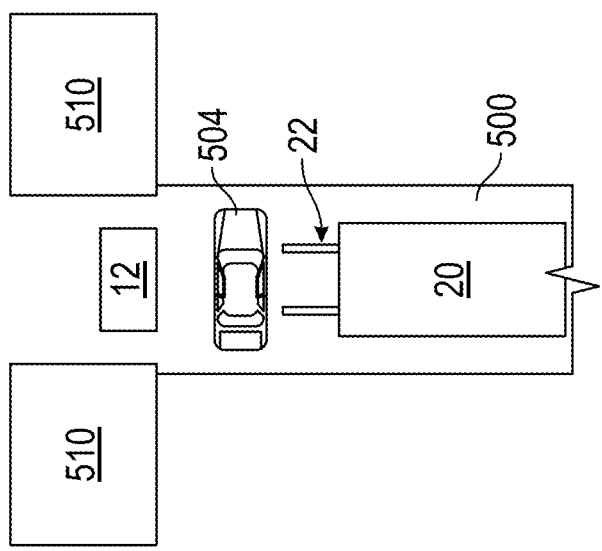

In FIG. 21, the refuse container 12 is placed in an alleyway between two buildings 510. A car 504 extends across the opening between the buildings 510, preventing the refuse vehicle 20 from accessing the refuse container 12. The car 504 also prevents the refuse container 12 from being removed from between the buildings 510, regardless of if an operator were to exit the refuse vehicle 20 to move the refuse container 12 by hand. As such, the container status determiner 340 determines that the status of refuse container 12 prevents a pickup at that stop.

Figure 22:
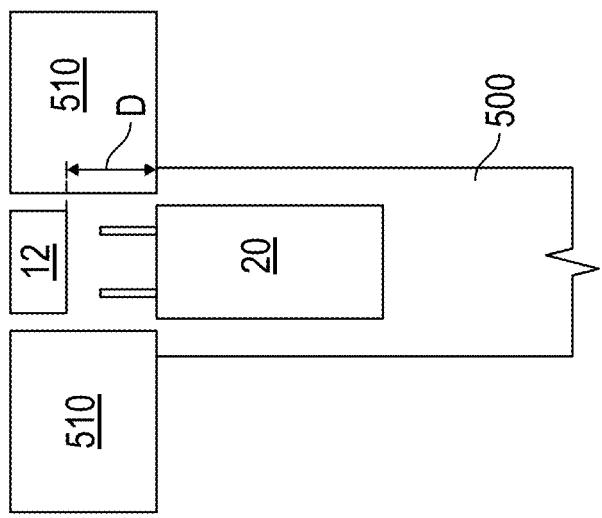
FIGS. 20-22 are top views of a front-loading refuse vehicle attempting to engage a refuse container, according to various embodiments.

In FIG. 22, the refuse container 12 is placed in an alleyway between two buildings 510. The buildings 510 are positioned close enough to one another so as to prevent the refuse vehicle 20 from driving between the buildings 510 to access the refuse container 12. Additionally, the refuse container 12 is positioned a distance D behind a front face of the buildings 510. The distance D is greater than the range of the collector 22 such that the distance from the path where the refuse vehicle 20 can travel is outside of the acceptable range. However, the refuse container 12 could be moved out of the alley and into the range of the collector 22 by an operator. Accordingly, the container status determiner 340 determines that the status of the refuse container 12 requires an extended-length pickup.

Figure 23:
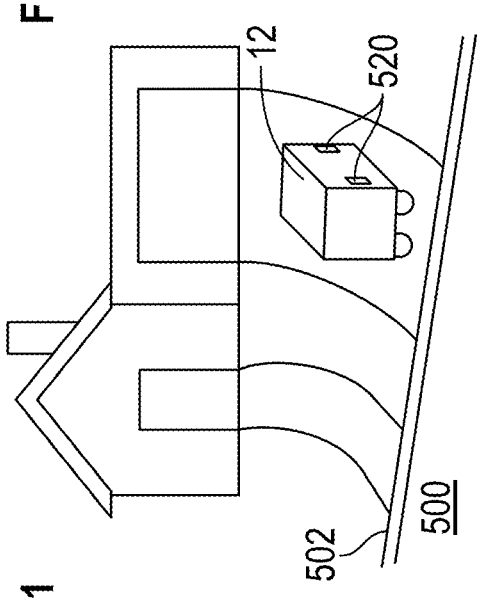
FIG. 23 is a perspective view of a refuse container, according to an exemplary embodiment.

In FIG. 23, the refuse container 12 defines a pair of apertures 520 configured to receive the collector 22 to engage the refuse container 12 with the collector 22. The apertures 520 are rotated away from the road 500 such that the orientation of the refuse container 12 about a vertical axis is outside of the acceptable range. However, the refuse container 12 could be reoriented to face the apertures 520 toward the road 500 by an operator. Accordingly, the container status determiner 340 determines that the status of the refuse container 12 requires an extended-length pickup.

Referring again to FIGS. 6 and 13, in step 458 a notification is provided to the customer based on the determined status. Specifically, the billing manager 310 provides a notification to a customer in response to a determination that one or more refuse containers 12 associated with the customer require an extended-length pickup or cannot be picked up. In some embodiments, the notification is provided to the customer through the customer device 50. In other embodiments, step 458 is omitted.

The notification may provide an indication to the customer that their refuse container 12 will not receive a standard pickup. By way of example, the notification may indicate that their refuse container 12 will receive an extended-length pickup or that their refuse container 12 will not be picked up. The notification may additionally or alternatively include an indication of a change to the customer's bill based on the status of their refuse container 12. By way of example, if the status indicates that the refuse container 12 will require an extended-length pickup, the notification may indicate that the customer will be charged an additional fee associated with additional resources required to empty their refuse container 12 relative to a standard pickup. By way of another example, the notification may indicate that the customer will not be charged because their pickup will not be performed.

The notification may additionally or alternatively include a request for the customer to move their refuse container 12 into a position better suited for pickup by the refuse vehicle 20. This request may include a deadline for moving the refuse container 12 (e.g., based on a predicted schedule of the route of the corresponding refuse vehicle 20). The request may outline a consequence that will occur if the refuse container is not moved by the deadline (e.g., an additional charge will be incurred, their refuse container 12 will not be emptied, etc.). The request may include instructions for responding to the request. By way of example, the customer may be able to respond to the request by following an internet hyperlink or by replying with an email. In the reply, the customer may indicate that they have complied with the request and moved the refuse container 12 to a more suitable position. Alternatively in the reply, the customer may indicate that they will not be complying with the request (e.g., because they are unable to reach the refuse container 12 by the deadline). In such a reply, the customer may accept an additional fee associated with the extended-length pickup, or may choose to cancel their pickup entirely.

In step 410, the system 10 repeats surveillance of a stop to determine if a status of a refuse container has changed. Specifically, the service manager 40 directs a drone 30 to surveil a stop after the initial review by the drones 30 but before the refuse vehicle 20 arrives at the stop. The container status determiner 340 may then reevaluate the status of the corresponding refuse container 12 using the new status data provided by the drone 30. The system 10 may automatically initiate step 410 for stops that are determined to have refuse containers 12 requiring non-standard pickups. This may facilitate automatically identifying if customers reposition the refuse containers 12 without requiring the customer to respond to the notification. In other embodiments, the system 10 may automatically initiate step 410 in response to receiving an indication from a customer that they have complied with the request in the notification of step 408 and repositioned the refuse container 12. In other embodiments, step 410 is omitted.

In step 412, the system 10 revises one or more route plans based on the determined status of one or more refuse containers 12. Specifically, the route generator 320 updates the route plans 322 and provides updated route plans to the corresponding refuse vehicles 20. By way of example, if a determined status of a refuse container 12 prevents the refuse container 12 from being emptied, the route generator 320 may remove the associated stop from the route plan for that day (e.g., such that the refuse vehicle 20 drives by the stop without stopping to retrieve the refuse container 12). By way of another example, if a determined status of a refuse container 12 indicates that the refuse container 12 should be emptied (e.g., the refuse container 12 is in position for a standard pickup), the route generator 320 may add the associated stop to the route plan for that day. The operator of the refuse vehicle 20 may be notified of the change in route plans through the user interface 182 (e.g., through new and/or different turn-by-turn instructions). In other embodiments, step 412 is omitted.

In step 414, the customer bill is updated based on the determined status of a refuse container 12. Specifically, the billing manager 310 my update the customer account data 312 to add or remove charges from the customer's account. By way of example, if a customer scheduled a pickup but the determined status of the refuse container 12 prevented the refuse container 12 from being emptied (e.g., the customer forgot to bring the refuse container out to the curb), the charge for that pickup may be reduced or removed from their account. By way of another example, if a status of a refuse container 12 was determined to require an extended-length pickup, a customer may be charged an additional fee to account for the additional time required at the stop. When a billing statement of a customer is affected by the determined status of a refuse container, the billing manager 310 may provide the associated status data (e.g., images of the refuse container), location data, and time stamp data with the billing statement.

According to an alternate embodiment, other vehicles than the enclosed embodiment (e.g., recycling truck, van, etc.) may utilize the system 10 to provide feedback to the vehicle 20. In some embodiments, a recycling truck may drive along a predetermined route, where the recycling truck includes a camera, fixedly coupled to the recycling truck. In such an embodiment, the drone 30 does not take images of the refuse container. The camera may be configured to operate similar to the camera 272 as described in FIG. 5. The camera may further be operably coupled to the control system 250 where the camera may provide still images of the refuse container 12 at each stop along the predetermined route. Based on the information provided from the camera, the control system 250 may communicate to the route generator 320 such to create the pickup schedule 314. The control system 250 is further operably coupled to the communication interface 250. By way of example, the communication interface 180 may communicate directly or indirectly with one or more refuse vehicles 20, the service manager, the customer devices 50, or other devices. In some embodiments, the communication interface 180 may communicate to the customer device 50 (e.g., text messaging, phone call, email, etc.) such to provide a notice to the customer. In such an embodiment, the notification to the customer may be a warning to bring the refuse container 12 to the pickup location; a warning that the refuse container 12 may be in the improper location and additional action is necessary from the customer so that they do not receive a fine; or an update to customer that the refuse container 12 is in the proper location and pickup will be on time. The communication interface 250 may further be configured to provide a communication to the customer the day before pickup as a reminder. In such an embodiment, the customer may have an option to opt out of service for that pickup. In the case that additional action is needed from the customer, the communication interface 250 may receive a communication from the customer acknowledging that the refuse container 12 has been moved to the proper location or to deny pickup. The route generator 320 is configured to further utilize the information provided by the customer to update the pickup schedule 314.

In another alternate embodiment, the drone dock 190 may be defined to be positioned in a separate location proximal to the predetermined route (e.g., storage warehouse, industrial facility, etc.). In such an embodiment, the drone 30 may be deployed ahead of the refuse vehicle 20 to collect the necessary images for the control system 250. The drone 30 may be deployed the night before the day of pickup or the morning of pickup. According to the alternate embodiment, the drone 30 may provide images to the control system for multiple predetermined routes.

Figure 24:
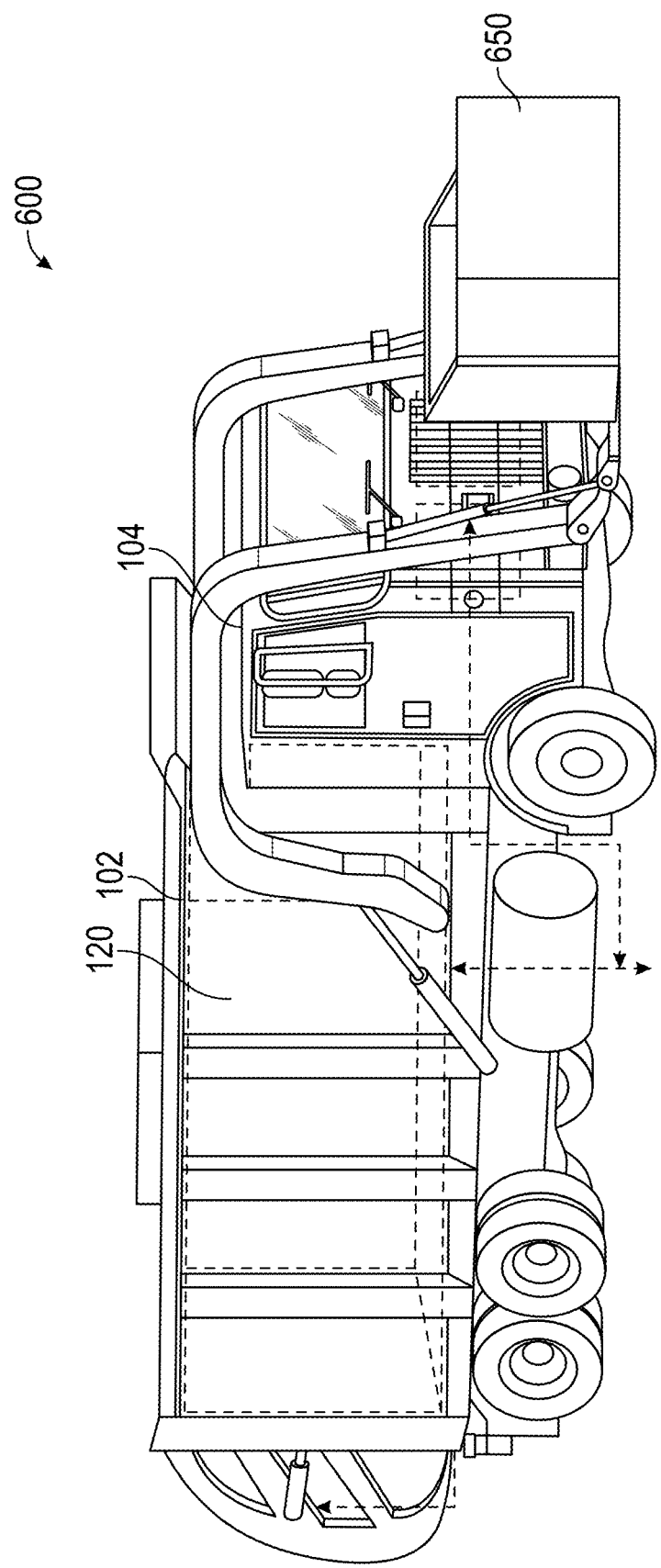
FIG. 24 is a perspective view of a carry-can refuse vehicle, according to an exemplary embodiment.

According to an exemplary embodiment, the refuse vehicle 20 may further be defined to be a carry-can refuse vehicle 600. Referring now to FIG. 24, a perspective view of the carry-can refuse vehicle 600 is shown, according to an exemplary embodiment. The carry-can refuse vehicle 600 is defined to be substantially similar to the refuse vehicle 20, such that like terms may be used to describe the carry-can refuse vehicle 600. The carry-can refuse vehicle 600 is defined to include a refuse container 650. The refuse container 650 is positioned at the front of the carry-can refuse vehicle 600. The refuse container 650 is configured to hold or transport refuse between locations. The refuse container 650 is defined to be fixedly coupled to the carry-can lateral stabilizer 600 such that refuse may be dumped into the refuse container 650. In some embodiments, the refuse container 650 may be defined to be a dumpster, where the dumpster may be selectively coupled to the carry-can refuse vehicle 600 by a fork assembly. The carry-can refuse vehicle 600 may include the drone 30, where the drone 30 is defined to travel ahead of the carry-can refuse vehicle 600 and capture images of the refuse container 12. The drone 30 communicates with the carry-can refuse vehicle 600 to provide the status of the refuse container 12.

Figure 25:
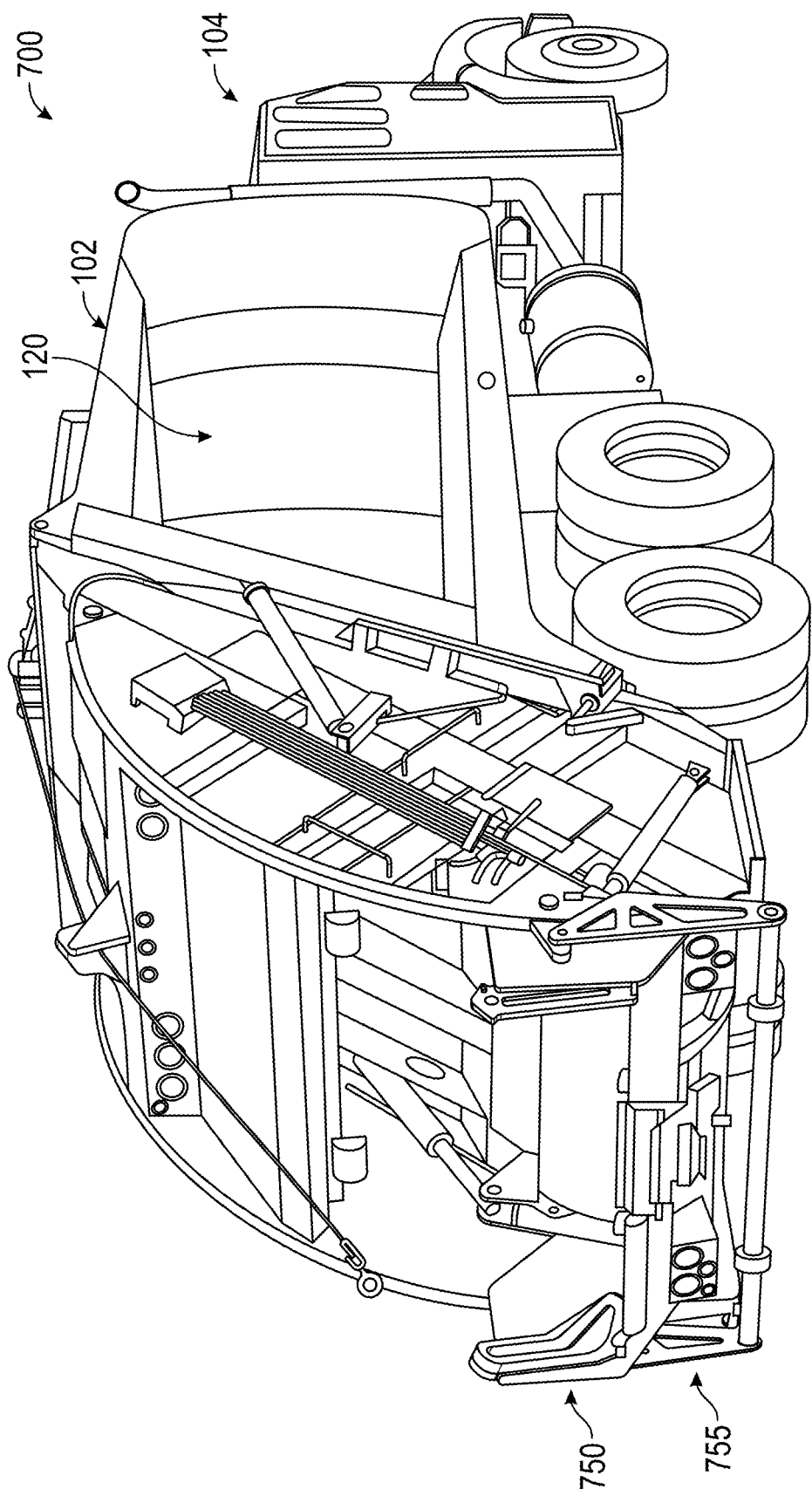
FIG. 25 is a rear, perspective view of a rear end loading refuse vehicle, according to an exemplary embodiment.

According to an exemplary embodiment, the refuse vehicle 20 may further be defined to be a rear end loading refuse vehicle 700. Referring to FIG. 25, a rear, perspective view of the rear end loading refuse vehicle 700 is shown, according to an exemplary embodiment. The rear end loading refuse vehicle 700 is defined to be substantially similar to the refuse vehicle 20, such that like terms may be used to describe the rear end loading refuse vehicle 700. The rear end loading refuse vehicle 700 includes a rear loading assembly 750 positioned at the rear of the rear end loading refuse vehicle 700. The rear loading assembly 750 includes a refuse container 755. The rear loading assembly 750 may interact with the refuse container 12 such to dump refuse into the refuse container 755. By way of example, the rear loading assembly 750 may be actuated in a vertical direction to dump the refuse into the compartment 120. The rear end loading refuse vehicle 700 may include the drone 30, where the drone 30 is defined to travel ahead of the rear end loading refuse vehicle 700 and capture images of the refuse container 12. The drone 30 communicates with the rear end loading refuse vehicle 700 to provide the status of the refuse container 12.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system 10 as shown in the various exemplary embodiments is illustrative only. Additionally, any element disclosed in one embodiment may be incorporated or utilized with any other embodiment disclosed herein. For example, the refuse vehicle 20 of the exemplary embodiment shown in at least FIG. 3 may be incorporated in the system 10 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A non-transitory computer-readable media comprising computer-readable instructions stored thereon that, when executed by a processor, causes the processor to:
   generate a route;
   control a drone to surveil an area along the route so that the drone travels along a predetermined route ahead of a refuse vehicle;
   generate, from a sensor on the drone, status data for one or more refuse containers;
   analyze the status data to determine a status of refuse within the area, wherein the status of refuse within the area includes an orientation of one of the one or more refuse containers relative to a predicted orientation;
   provide a notification to a customer based on the status of refuse;
   repeat surveillance to determine if the status of refuse has changed;
   generate a revised route in response to determining that the status of refuse has changed; and
   update a customer bill in response to determining that the status of refuse has changed.

2. The non-transitory computer-readable media of claim 1, wherein the processor is configured to categorize the status of refuse as one of (a) in condition for a standard pickup, (b) in condition for an extended-length pickup, or (c) in condition for an incomplete pickup.

3. The non-transitory computer-readable media of claim 2, wherein the processor is configured to categorize the status of refuse based on (a) a distance between a refuse container and the route, (b) if an obstacle is present that obstructs access to one of the one or more refuse containers, or (c) a location of obstacles in relation to a refuse container.

4. The non-transitory computer-readable media of claim 2, wherein the processor is configured to send a communication to the customer in response to the status of the refuse being categorized as in condition for the incomplete pickup.

5. The non-transitory computer-readable media of claim 4, wherein the processor is configured to receive an indication from the customer that the status of the refuse is categorized as in condition for the standard pickup.

6. The non-transitory computer-readable media of claim 4, wherein the processor is configured to record an instance where the communication is not sent to the customer prior to pickup.

7. The non-transitory computer-readable media of claim 1, wherein the processor is configured to send the revised route to a refuse vehicle.

8. The non-transitory computer-readable media of claim 1, wherein the sensor is a camera.

9. The non-transitory computer-readable media of claim 1, wherein the processor is configured to send the status of refuse to a refuse vehicle.

10. The non-transitory computer-readable media of claim 1, wherein the processor is configured to determine the status of refuse prior to the refuse vehicle arrives within the area.

11. A non-transitory computer-readable media comprising computer-readable instructions stored thereon that, when executed by a processor, causes the processor to:
    control a drone to travel along a predetermined route ahead of a refuse vehicle;
    receive data from a sensor of the drone;
    determine, based on the data, a status of refuse within a scan area before the refuse vehicle arrives at the scan area, wherein the status of refuse includes an orientation of a refuse container relative to the predetermined route;
    generate a route for the refuse vehicle based on the status of refuse within the scan area;
    generate a modified route for the refuse vehicle based on the status of refuse within the scan area; and
    provide a signal to the refuse vehicle regarding the status of the refuse within the scan area.

12. The non-transitory computer-readable media of claim 11, wherein the processor is configured to categorize the status of refuse as one of (a) in condition for a standard pickup, (b) in condition for an extended-length pickup, or (c) in condition for an incomplete pickup.

13. The non-transitory computer-readable media of claim 12, wherein the processor is configured to categorize the status of refuse based on (a) a distance between a refuse container and the route, (b) if an obstacle is present that obstructs access to the refuse container, or (c) a location of obstacles in relation to the refuse container.

14. The non-transitory computer-readable media of claim 12, wherein the processor is configured to send a communication to a customer in response to the status of the refuse being categorized as in condition for the incomplete pickup.

15. The non-transitory computer-readable media of claim 14, wherein the processor is configured to receive an indication from the customer that the status of the refuse is categorized as in condition for the standard pickup.

16. The non-transitory computer-readable media of claim 14, wherein the processor is configured to record an instance where the communication is not sent to the customer prior to pickup.

17. The non-transitory computer-readable media of claim 11, wherein the processor is configured to send the modified route to the refuse vehicle in response to determining that the status of refuse has changed within the scan area.

18. The non-transitory computer-readable media of claim 11, wherein the sensor is a camera.

\* \* \* \* \*